(12) United States Patent
Chelur et al.

(10) Patent No.: US 9,442,937 B2
(45) Date of Patent: *Sep. 13, 2016

(54) METHODS AND SYSTEMS FOR CREATING AND REMOVING VIRTUAL MACHINE SNAPSHOTS BASED ON GROUPS OF METRICS

(71) Applicant: Nimble Storage, Inc., San Jose, CA (US)

(72) Inventors: Raja Shekar Chelur, Apex, NC (US); Juhsun Wang, Santa Clara, CA (US); Gaurav Ranganathan, San Jose, CA (US)

(73) Assignee: Nimble Storage, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/752,329

(22) Filed: Jun. 26, 2015

(65) Prior Publication Data

US 2016/0063014 A1    Mar. 3, 2016

Related U.S. Application Data

(63) Continuation of application No. 14/474,014, filed on Aug. 29, 2014, now Pat. No. 9,092,376.

(51) Int. Cl.
  *G06F 12/00*    (2006.01)
  *G06F 17/30*    (2006.01)
  (Continued)

(52) U.S. Cl.
  CPC ....... *G06F 17/30088* (2013.01); *G06F 3/0619* (2013.01); *G06F 3/0665* (2013.01); *G06F 3/0689* (2013.01); *G06F 9/45558* (2013.01); *G06F 11/1451* (2013.01); *G06F 11/1456* (2013.01); *G06F 17/30215* (2013.01); *G06F 17/30233* (2013.01);
  (Continued)

(58) Field of Classification Search
  None
  See application file for complete search history.

(56) References Cited

U.S. PATENT DOCUMENTS 8,091,087 B2    1/2012   Ali et al.
8,261,268 B1    9/2012   Forgette
(Continued)

OTHER PUBLICATIONS

"13.5. Working with Snapshots", CloudStack, downloaded Apr. 17, 2014 from: http://cloudstack.apache.org/docs/en-US/Apache_CloudStack/4.1.1/html/Admin_Guide/working-with-snapshots.html, 3 pages.

(Continued)

*Primary Examiner* — Reginald Bragdon
*Assistant Examiner* — Michael Westbrook
(74) *Attorney, Agent, or Firm* — Ascenda Law Group, PC

(57) ABSTRACT

Techniques are described herein which minimize the impact of virtual machine snapshots on the performance virtual machines and hypervisors. In the context of a volume snapshot which may involve (i) taking virtual machine snapshots of all virtual machines associated with the volume, (ii) taking the volume snapshot, and (iii) removing all the virtual machine snapshots, the virtual machine snapshots may be created in a first order and removed in a second order. Specifically, snapshots for busy virtual machines (i.e., virtual machines with higher disk write activity) may be created last and removed first. Consequently, snapshots of busy virtual machines are retained for the shorter periods of time, thereby minimizing the effect of virtual machine snapshots on those virtual machines (and their associated hypervisors) that would be most negatively impacted by virtual machine snapshots.

17 Claims, 13 Drawing Sheets

(51) Int. Cl.
 G06F 11/14 (2006.01)
 G06F 3/06 (2006.01)
 G06F 9/455 (2006.01)
(52) U.S. Cl.
 CPC .............. *G06F 2009/45562* (2013.01); *G06F 2009/45575* (2013.01); *G06F 2201/84* (2013.01)

(56) References Cited

U.S. PATENT DOCUMENTS

| | | | |
|---|---|---|---|
| 8,566,542 B1 | 10/2013 | Wang et al. | |
| 8,650,562 B2* | 2/2014 | Hou et al. | 718/1 |
| 8,688,935 B1* | 4/2014 | Yochai | G06F 3/0608 707/639 |
| 8,769,048 B2 | 7/2014 | Kottomtharayil | |
| 8,949,187 B1* | 2/2015 | Satish et al. | 707/640 |
| 8,959,509 B1* | 2/2015 | Sobel et al. | 718/1 |
| 2004/0068636 A1* | 4/2004 | Jacobson et al. | 711/203 |
| 2007/0244938 A1* | 10/2007 | Michael | G06F 11/1458 |
| 2007/0271560 A1 | 11/2007 | Wahlert et al. | |
| 2009/0177718 A1* | 7/2009 | Patterson | G06F 11/1458 |
| 2009/0300303 A1* | 12/2009 | Balasubramanian | 711/162 |
| 2011/0047340 A1* | 2/2011 | Olson | G06F 11/1456 711/162 |
| 2011/0225582 A1* | 9/2011 | Iikura | G06F 11/1415 718/1 |
| 2012/0084501 A1* | 4/2012 | Watanabe et al. | 711/112 |
| 2012/0131480 A1 | 5/2012 | Kalmbach et al. | |
| 2012/0323853 A1 | 12/2012 | Fries et al. | |
| 2013/0054911 A1* | 2/2013 | Keller et al. | 711/162 |
| 2014/0026133 A1* | 1/2014 | Parker | 718/1 |
| 2014/0052953 A1* | 2/2014 | Ben-Tsion | G06F 3/0605 711/172 |
| 2014/0196039 A1 | 7/2014 | Kottomtharayil et al. | |
| 2015/0052528 A1 | 2/2015 | French et al. | |

OTHER PUBLICATIONS

"About schedule options for creating recovery points", Symantec Corporation (updated Oct. 17, 2013), downloaded Sep. 5, 2014 from: http://www.symantec.com/docs/HOWTO13633, 5 pgs.
"Backup Schedule Options", Symantec Corporation (updated Jul. 31, 2011), downloaded Sep. 5, 2014 from: http://www.symantec.com/docs/HOWTO23716, 2 pgs.
"CommCell Scalability Guide", CommVault Systems, downloaded Sep. 5, 2014 from: http://documentation.commvault.com/hds/v10/article?p=features/scalability/commcell.htm, 12 pgs.
"Create a Scheduled Task in the vSphere Web Client", Vmware vSphere 5.1 Documentation Center, downloaded Sep. 5, 2014 from http://pubs.vmware.com/vsphere-51/topic/com.vmware.vsphere.vcenterhost.doc/GUID-03B90638-6C70-4379-8CAF-D66866D115F4.html, 5 pgs.
"EMC VNXe Data Protection", EMC White Paper (Jan. 2013), 28 pgs.
"FalconStor Snapshot Director for VMware vSphere: User Guide", FalconStar Software, accessed Sep. 5, 2014, Version 5.00, 57 pgs.
"Managing Schedules for Snapshots and Replicas", PS Series Group Administration, downloaded Sep. 5, 2014 from: http://psonlinehelp.equallogic.com/V3.3/managing_schedules_for_snapshots_and_replicas.htm, 6 pgs.
"Multi-Instance Snap Optimization" CommVault Systems, downloaded Sep. 5, 2014 from: http://documentation.commvault.com/hds/v10/article?p=products/oracle/snap/snap_optimization.htm, 31 pgs.
"Multiple Nimble Microsoft VSS snapshots?", NimbleConnect (Jul. 2014), downloaded Sep. 5, 2014 from: https://connect.nimblestorage.com/thread/1714, 4 pgs.
"Pillar Axiom Data Protection Manager: Application-Consistent Automated Clone Management", Oracle Data Sheet (2013), 2 pgs.
"Scheduling—Getting Started", CommVault Systems, downloaded Sep. 5, 2014 from: http://documentation.commvault.com/hds/v10/article?p=features/scheduling/getting_started.htm, 6 pgs.
"Scheduling snapshots for multiple SQL instances in a Windows cluster?" NetApp Community (Sep.-Oct. 2011), downloaded Sep. 5, 2014 from: https://communities.netapp.com/thread/17429, 5 pgs.
"Stagger Snapshot copy schedules to avoid transfer conflicts", NetApp (updated Feb. 11, 2009), downloaded Sep. 5, 2014 from: https://library.netapp.com/ecmdocs/ECMM1224454/html/rnote/rel_notes/concept/c_oc_rn_lim-dp-snapshot-stagger.html, 1 pg.
"VM Snapshots: What they are and how to use them", Aug. 4, 2011, 2 pages.
Barr, "Veeam Enables Dramatically Better RPOs with Backup from Storage Snapshots," Veeam News Room, dated May 20, 2013, 7 pages.
Daemonchild, "vSphere Snapshots (Part 1)," dated Dec. 15, 2010, 5 pages.
Das, "SnapManager 2.0 for Virtual Infrastructure Best Practices," NetApp, Technical Report (Jan. 2010), 37 pages.
Dell Equallogic, "Auto-Snapshot Manager/Microsoft Edition for Hyper-V," Solution Brief, 2009, 2 pages.
Equallogic, "PS Series Storage Arrays," Group Administration PS Series Firmware Version 5.0 dated Jun. 2010, 256 pages.
Experts Exchange, LLC, "Best order in which I should commit ESX Snapshots," dated Feb. 19, 2009, 15 pages.
Gilman; et al., "How Dell EqualLogic Auto-Snapshot Manager / Vmware Edition Helps Protect Virtual Environments" Dell Power Solutions (Nov. 2008), pp. 42-45.
Hazelman, Doug, "Countdown to v7—Backup from Storage Snapshots," Veeam, dated Jun. 24, 2013, 8 pages.
Jokeru, "The 'high load vm/ esxi nfs backup error' story," Wiki'ed, dated Mar. 19, 2014, 5 pages.
Microsoft, "Hyper-V Virtual Machine Snapshots: FAQ," dated Mar. 11, 2009, 3 pages.
Padron; et al., "A Case Study for Successful Deployment : Tivoli Storage Manager for Virtual Environments Data Protection for Vmware", IBM (Jun. 30, 2014), V1.0, 28 pgs.
Redhat, "Using Virtual Machine Snapshots," Redhat Customer Portal, date of access Aug. 29, 2014, 3 pages.
Search VMware.com, "Deleting virtual machine snapshots without wasting disk space," Tech Target, dated Mar. 11, 2011, 5 pages.
Siebert; et al., "Mistakes Made When Backing Up VMs & How to Prevent Them," Tech Target (2011), 13 pages.
Sina Esfandiarpoor; All Pahlavan; Maziar Goudarzi, "Virtual Machine Consolidation for Datacenter Energy Improvement," Sharif University of Technology, Feb. 9, 2013, 11 pages.
Techtarget, SearchStorage.com, "Storage Snapshot," dated Jul. 19, 2005, 1 page.
Throttling Replication Director Operations with NetBackup, Enterprise Support, Symantec Corporation (updated Sep. 29, 2013), downloaded Apr. 17, 2014 from: https://support.symantec.com/en_US/article.HOWTO87048.html, 19 pages.
Timothy Dewin, "What is the buzz around Backup from Storage Snapshots anyway?" Timo's Techie Corner, dated May 21, 2014, 8 pages.
UP2V, "Know the performance impact of snapshots used for backup," dated May 9, 2011, 8 pages.
Veeam, "How to create backups from storage snapshots with Veeam," Veeam Backup & Replication v7, dated Jun. 2014, 6 pages.
Veeam, "Snapshot removal issues of a large VM," VMware vSphere Community Forums, dated Jan. 19, 2010, 6 pages.
Veeam. "Step 3. Define VM Processing Order: User Guide for Veeam Backup Enterprise Manager," Veeam Backup Enterprise Manager 7.0, dated Nov. 18, 2013, 2 pages.
VMware, "Best practices for virtual machine snapshots in the VMware environment," VMware Knowledge Base, dated Dec. 20, 2013, 3 pages.
VMware, "Understanding Snapshots," Managing Virtual Machines, date of access Aug. 29, 2014, 2 pages.
VMware, "Understanding virtual machine snapshots in VMware ESXi and ESX," VMware Knowledge Base, dated Aug. 11, 2014, 5 pages.
VMware, "VMware vSphere Snapshot Best Practices," Apr. 17, 2014, 7 pages.

(56) References Cited

OTHER PUBLICATIONS

Vnoob, "Configure VM Snapshots for Crash-Consistent Quiescing with PowerCLI," Professional VMware, dated Dec. 14, 2012, 6 pages.
Office Action dated Dec. 4, 2015 from U.S. Appl. No. 14/474,014, filed Aug. 29, 2014, 33 pgs.
Amendment and Response to Office Action dated Feb. 24, 2014 from U.S. Appl. No. 14/474,014, filed Aug. 29, 2014, 8 pgs.
Final Office Action dated Mar. 23, 2015 from U.S. Appl. No. 14/474,014, filed Aug. 29, 2014, 36 pgs.
Amendment and Response to Final Office Action dated May 8, 2015 from U.S. Appl. No. 14/474,014, filed Aug. 29, 2014, 10 pgs.
Notice of Allowance dated May 22, 2015 from U.S. Appl. No. 14/474,014, filed Aug. 29, 2014, 8 pgs.
Notice of Allowance dated Jun. 22, 2015 from U.S. Appl. No. 14/474,014, filed Aug. 29, 2014, 8 pgs.

* cited by examiner

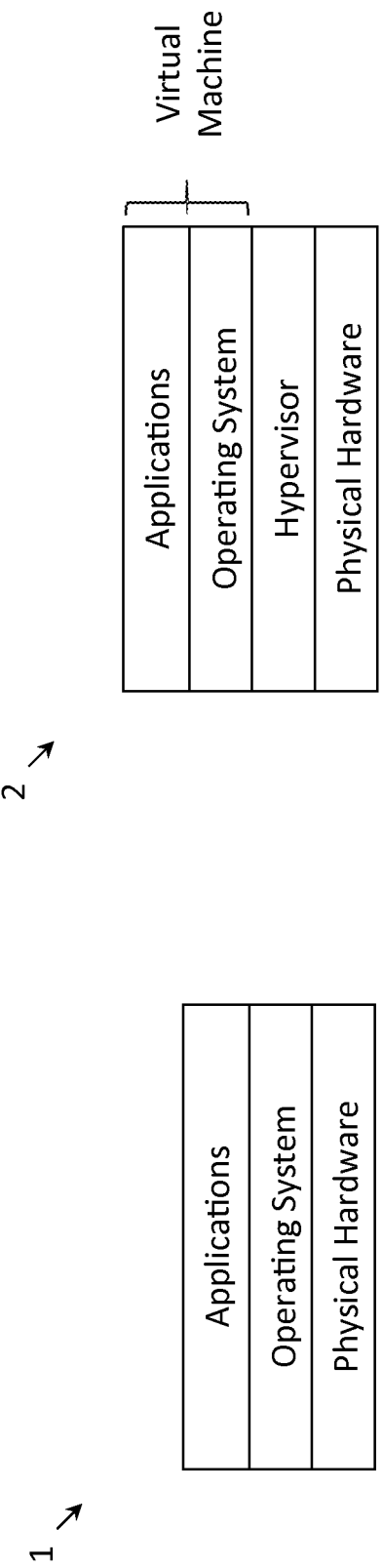

| Metric | Weight of Metric | Rank of VM |||||
|---|---|---|---|---|---|---|
| | | VM 50 | VM 52 | VM 54 | VM 56 | VM 58 |
| Disk writes before snapshot creation | 3 | 5 | 4 | 3 | 2 | 1 |
| Disk writes between snapshot creation and snapshot removal | 2 | 4 | 3 | 5 | 1 | 2 |
| Time taken to create snapshot | 1 | 3 | 2 | 5 | 4 | 1 |
| Size of child disk | 4 | 4 | 5 | 3 | 2 | 1 |
| Consolidated rating | -- | 42 | 40 | 36 | 20 | 12 |

Fig. 9A

| Metric | Weight of Metric | Rank of VM |||||
|---|---|---|---|---|---|---|
| | | VM 50 | VM 52 | VM 54 | VM 56 | VM 58 |
| Disk writes before snapshot creation | 3 | 5 | 4 | 3 | 2 | 1 |
| Disk writes between snapshot creation and snapshot removal | 2 | 5 | 1 | 2 | 3 | 4 |
| Time taken to create snapshot | 1 | 5 | 1 | 3 | 2 | 4 |
| Size of child disk | 4 | 5 | 2 | 3 | 4 | 1 |
| Consolidated rating | -- | 50 | 23 | 28 | 30 | 19 |

Fig. 9B

METHODS AND SYSTEMS FOR CREATING AND REMOVING VIRTUAL MACHINE SNAPSHOTS BASED ON GROUPS OF METRICS

RELATED APPLICATIONS

This application is a Continuation of U.S. patent application Ser. No. 14/474,014 filed on Aug. 29, 2014, incorporated herein by reference.

FIELD OF THE INVENTION

The present invention relates to methods and systems for managing virtual machine snapshots, and more particularly relates to an order for creating virtual machine snapshots and an order for removing virtual machine snapshots.

BACKGROUND

To provide some background of a virtual machine, abstracted representations of several computing systems are first described. FIG. 1 depicts an abstracted representation of computing system 1 with a plurality of software applications (hereinafter, "applications"), a single operating system and physical hardware. Such components at times may be referred to as the different "layers" of the computing system (i.e., applications layer, operating system layer, physical hardware layer). The applications utilize the physical hardware (e.g., processors, memory, disk drives, network interface card, sound card, etc.) to help a user (not depicted) perform a specific task (e.g., word processing, surfing the web, etc.). The applications, however, typically do not interact directly with the physical hardware of computing system 1. Instead, the applications interact with the physical hardware through an operating system. For example, an application may send a request to the operating system to store data on a storage device of the physical hardware, and the operating system, in turn, may perform such request on behalf of the application. A single operating system typically hosts a plurality of applications, and accordingly, is tasked with managing how the applications share the resources of the physical hardware so that there are no contentions, data corruption, etc. On the other hand, the physical hardware of computer system 1 can typically only host a single operating system (or more precisely, only one operating system at any moment).

FIG. 2 depicts an abstracted representation of computing system 2 with an added layer between the operating system and the physical hardware. This layer is called the hypervisor (or also the virtual machine manager). In an analogous manner to how an operating system can manage how a plurality of applications share the resources of the physical hardware, the hypervisor can manage how a plurality of operating systems share the resources of the physical hardware. In computing system 2, the top two layers (i.e., applications and operating system) can be bundled together as a single unit, called a virtual machine.

Since the hypervisor allows a plurality of operating systems to execute at the same time, a plurality of virtual machines can also execute at the same time. Such an arrangement is depicted in computer system 3 of FIG. 3, in which the hypervisor hosts a plurality of virtual machines (VMs). Each virtual machine could be a virtual desktop, allowing a plurality of users to share the resources of the physical hardware. Alternatively, each virtual machine could be a web server and/or an application server, allowing a plurality of enterprises to share the resources of the physical hardware.

A virtual machine is typically characterized by the following information: virtual machine data, virtual machine configuration, and virtual machine operational state. Virtual machine data may refer to the contents of the virtual machine's hard disk (i.e., in-disk data). Such contents may include the virtual machine's operating system and application data. Typically, a virtual machine's hard disk does not correspond to a dedicated physical hard disk (i.e., physical hard disk that is dedicated to the virtual machine). Rather, a collection of hard disks is typically shared by a number of virtual machines. Consequently, a virtual machine's hard disk more accurately corresponds to portions of one or more physical hard disks that are accessible to the virtual machine. In some cases, a virtual machine's hard disk is represented by one or more files (e.g., .vmdk files) that are stored in the collection of hard disks. Virtual machine data may additionally refer to the contents of the virtual machine's memory (i.e., in-memory data). Typically, a virtual machine's memory does not correspond to a dedicated memory card or memory chip (i.e., memory card or memory chip that is dedicated to the virtual machine). Rather, a pool of memory (e.g., formed by a plurality of memory cards and/or memory chips) is typically shared by a number of virtual machines, so a virtual machine's memory more accurately corresponds to portions of one or more memory cards and/or memory chips that are accessible to the virtual machine.

Virtual machine configuration may refer to the hardware resources required or requested by a virtual machine (e.g., the number of virtual central processing units (CPUs), an amount of random-access memory (RAM), the number of network interface cards (NICs), etc., and what type of each hardware components, if the hardware components come in different types). A virtual CPU refers to one or more CPUs of the physical hardware that may be shared by one or more virtual machines.

Virtual machine operational state may refer to the operational state of a virtual machine (e.g., whether the virtual machine is powered off, powered on, suspended, whether the contents of the virtual machine's memory have been written to a VMkernel swap file, the number of virtual machine snapshots, the relationship between snapshots and the virtual machine's disks, etc.). Snapshots of a virtual machine are described below.

The state of a virtual machine typically refers to one or more of the virtual machine data, the virtual machine configuration, and virtual machine operational state at a particular point in time. In some cases, the state of a virtual machine refers to the virtual machine data, the virtual machine configuration, and virtual machine operational state (i.e., all three) at a particular point in time. It is noted that there is a potential for confusion in terminology as the "virtual machine operational state" is sometimes called "virtual machine state" by those in the field of the art, so it is necessary to rely on the context in which the term (i.e., virtual machine state) is used in order to determine whether virtual machine state refers to one or more of the virtual machine data, the virtual machine configuration, and virtual machine operational state at a particular point in time, or just the virtual machine operational state. To avoid such confusion, virtual machine state will hereinafter refer to one or more of the virtual machine data, the virtual machine configuration, and virtual machine operational state at a particular point in time. When referring specifically to the virtual machine operational state, the term "virtual machine operational state" will be used rather than the "virtual machine state".

An operation that can be performed to preserve the state of a virtual machine at a particular point in time is called snapshotting. The information representing the state of a virtual machine at a particular point in time, after a snapshotting operation, may be called a virtual machine snapshot (or just a snapshot in short, if the context is clear). After a snapshot is taken at a particular time, a user can revert to the state of the virtual machine at that particular time (i.e., return one or more of the virtual machine data, virtual machine operational state, and virtual machine configuration to the state they were in at the time the snapshot was taken).

There are two types of virtual machine snapshots: crash-consistent snapshots and application-consistent snapshots. A crash-consistent snapshots only preserves the contents of a virtual machine's disk, whereas an application-consistent snapshot preserves the contents of the virtual machine's disk and memory. More precisely, data in the operating system's file system buffer (e.g., data that has been saved in the operating system's file system buffer but not yet saved on disk) may be saved in an application-consistent snapshot, but not saved in a crash-consistent snapshot. To elaborate, data may be saved in the operating system's file system buffer when an application (e.g., a word processing application) performs a save operation. On the other hand, unsaved application data (e.g., changes made to a Microsoft™ Word™ document that have not yet been saved) may not be captured by either a crash-consistent snapshot or an application-consistent snapshot.

In terms of performance, a crash-consistent snapshot has no impact (or very little impact) on the hypervisor or the virtual machine, as it is created and managed by the underlying disk storage (or disk storage system) without any interaction with the hypervisor. An application-consistent snapshot, on the other hand, does involve the hypervisor. First, the hypervisor flushes the in-memory data of the virtual machine to disk (e.g., creates a file on the disk storage system that holds a point-in-time copy of the in-memory data of the virtual machine). Second, the hypervisor makes the file (or possibly, plurality of files) that holds the in-disk data of the virtual machine read only and creates a separate file to store any new data or modifications to existing data. The former file (i.e., the file holding the in-disk data) is typically called the parent disk, and the latter file (i.e., the file storing new data or modifications to existing data) is often called the child disk (or delta disk). While crash-consistent snapshots have been described to offer a point of contrast to application-consistent snapshots, the remainder of the discussion will focus on application-consistent snapshots.

A virtual machine snapshot typically does not require the copying or duplication of any data (other than the point-in-time copy of the in-memory data of the virtual machine), but rather "freezes" the state of the virtual machine at a certain point in time by the creation of the read-only parent disk. If the user decides to restore the state of the virtual machine to that of the snapshot, the child disk is deleted and the virtual machine reverts to the state stored in the parent disk. Such operation is sometimes called "restoring" a snapshot. If the user decides that the snapshot is no longer needed (i.e., there is no longer a need to restore the virtual machine to the state when the snapshot was taken), the data of the child disk is incorporated (or merged) into the parent disk. Such operation is sometimes referred to as the "removal" or "deletion" of a snapshot.

While virtual machine snapshots are a useful administrative tool (e.g., allowing a user to restore a virtual machine to its state from an earlier point in time), virtual machine snapshots may negatively impact the performance of virtual machines and hypervisors. Such performance impact and techniques to address same are discussed herein.

SUMMARY OF THE INVENTION

In accordance with one embodiment, techniques are provided which minimize the performance impact of virtual machine snapshots on virtual machines and hypervisors. In the process of taking virtual machine snapshots in conjunction with a volume snapshot (volume snapshots described below) (i) snapshots of all virtual machines associated with a volume (e.g., a logical partition of a RAID group) may be taken, (ii) a volume snapshot may be taken, and (iii) all the virtual machine snapshots may be removed. In such a process, the virtual machine snapshots may be created in a first order and may be removed in a second order. Specifically, snapshots for busy virtual machines (e.g., virtual machines with higher disk write activity) may be taken last and removed first, whereas snapshots for idle virtual machines (e.g., virtual machines with lower disk write activity) may be taken first and removed last. Consequently, snapshots of busy virtual machines may be retained for the shortest amount of time, thereby minimizing the impact of virtual machine snapshots on busy virtual machines. It is noted that the larger the variation in disk write activity, the greater the benefits of the virtual machine snapshot ordering techniques described herein (e.g., in terms of a reduction in the cumulative time to remove all virtual machine snapshots, and reduced disk reads and writes for the hypervisor and the storage system).

Various measurements may be taken to ascertain the disk write activity associated with each virtual machine. For example, the number and/or rate of disk writes of a virtual machine may be measured in a time period prior to the virtual machine's snapshot creation, such measurement referred to herein as metric 1. As another example, the number and/or rate of disk writes between the creation of a snapshot to just after the completion of the volume snapshot may be measured for each virtual machine, such measurement referred to herein as metric 2. As another example, the time taken to create a virtual machine snapshot may be measured for each virtual machine, such measurement referred to herein as metric 3. As another example, the size of the child disk just after the conclusion of the volume snapshot could be measured for each virtual machine, such measurement referred to herein as metric 4. Metric 1 could be used to determine the first order in which the virtual machine snapshots are created (as it is determined prior to the creation of snapshots), whereas one or more of metrics 1-4 may be used to determine the second order in which the virtual machine snapshots are removed.

When more than one metric is used to ascertain the disk write activity of a virtual machine, weights may be associated with the respective metrics. Higher weight may be assigned to those metrics known to be better indicators (or predictors) of disk write activity and/or known to be more correlated with virtual machine and hypervisor performance.

In accordance with one embodiment, a storage system may determine a first order of the virtual machines associated with a storage volume, the determination being based on one or more metrics associated with the virtual machines. The storage system may then request a snapshot to be created for each of the virtual machines so as to maintain a state of each of the virtual machines, wherein the request causes respective processes that create each of the virtual machine snapshots to be initiated in the first order. Once the virtual machine snapshots have been created, the storage system may create a snapshot of the storage volume so as to maintain a state of the storage volume. The storage system may then determine a second order of the virtual machines, the determination being based on one or more of the metrics associated with the virtual machines. The storage system may then request the virtual machine snapshots to be removed, the request causing respective processes that remove each of the virtual machine snapshots to be initiated in the second order. The state of the storage volume may include the state of each one of the virtual machines. As a consequence, the volume snapshot may maintain the state of each of the virtual machines even after the virtual machine snapshots have been removed.

These and other embodiments of the invention are more fully described in association with the drawings below.

BRIEF DESCRIPTION OF THE DRAWINGS

FIG. 1 depicts an abstracted representation of a computing system in which the operating system directly interfaces with the physical hardware of the computing system.

FIG. 2 depicts an abstracted representation of a computing system in which the operating system interfaces with the physical hardware via a hypervisor.

FIGS. 9A-9B depict tables containing (i) virtual machine rankings for each of a plurality of metrics, and (ii) the weights associated with the metrics, in accordance with one embodiment.

DETAILED DESCRIPTION OF THE INVENTION

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention. Description associated with any one of the figures may be applied to a different figure containing like or similar components/steps. While the flow diagrams each present a series of steps in a certain order, the order of the steps is for one embodiment and it is understood that the order of steps may be different for other embodiments.

Figure 4:
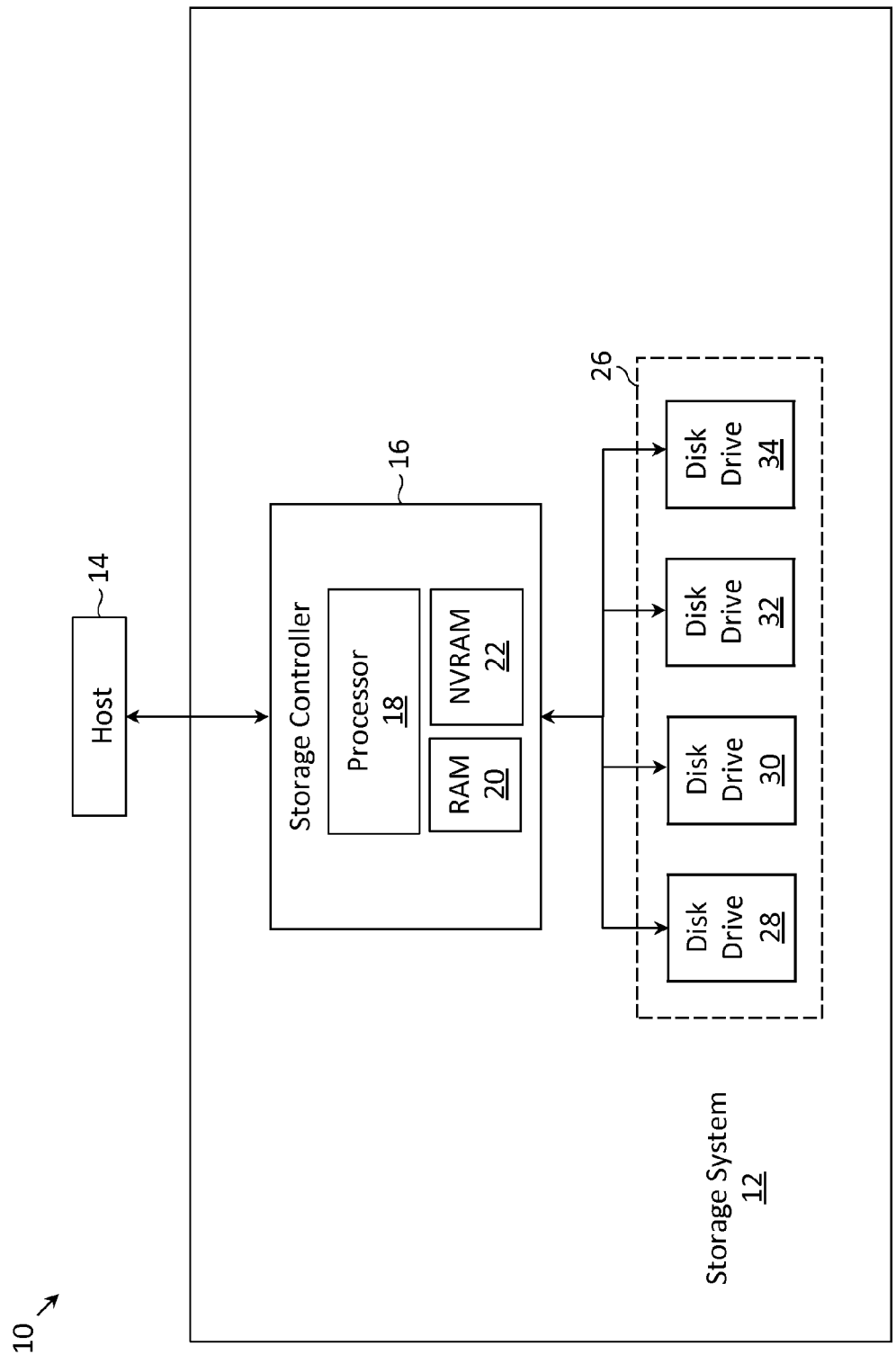
FIG. 4 depicts a storage system communicatively coupled to a host, in accordance with one embodiment.

FIG. 4 depicts system 10 in which storage system 12 may be communicatively coupled to host 14, in accordance with one embodiment. Host 14 may transmit read and/or write requests to storage system 12, which in turn may process the read and/or write requests. While not depicted, storage system 12 may be communicatively coupled to host 14 via a network. The network may include a LAN, WAN, MAN, wired or wireless network, private or public network, etc.

Storage controller 16 of storage system 12 may receive the read and/or write requests and may process the read and/or write requests by, among other things, communicating with one or more of a plurality of storage units (28, 30, 32, 34). The plurality of storage units may be collectively referred to as storage array 26. While each of the storage units is depicted as a disk drive (typically understood as a magnetic disk based storage device) in FIG. 4, the storage devices more generally may include one or more solid-state drives (e.g., flash drives), magnetic disk drives (e.g., hard disk drives), optical drives, etc. While four disk drives have been depicted in storage array 26, this is not necessarily so, and a different number of disk drives may be employed in storage array 26.

Storage controller 16 may include processor 18, random access memory (RAM) 20 and non-volatile random access memory (NVRAM) 22. Processor 18 may direct the handling of read and/or write requests, and may oversee a volume snapshot (described below). RAM 20 may be used as a buffer (e.g., storing yet to be processed read and/or write requests) and/or may be used as a cache (e.g., storing data that has been retrieved from storage array 26 but not yet provided to host 14). A portion of RAM 20 may be referred to herein as the main memory of storage system 12. NVRAM 22 may store data that must be maintained, despite a loss of power to storage system 12.

Figure 5A:
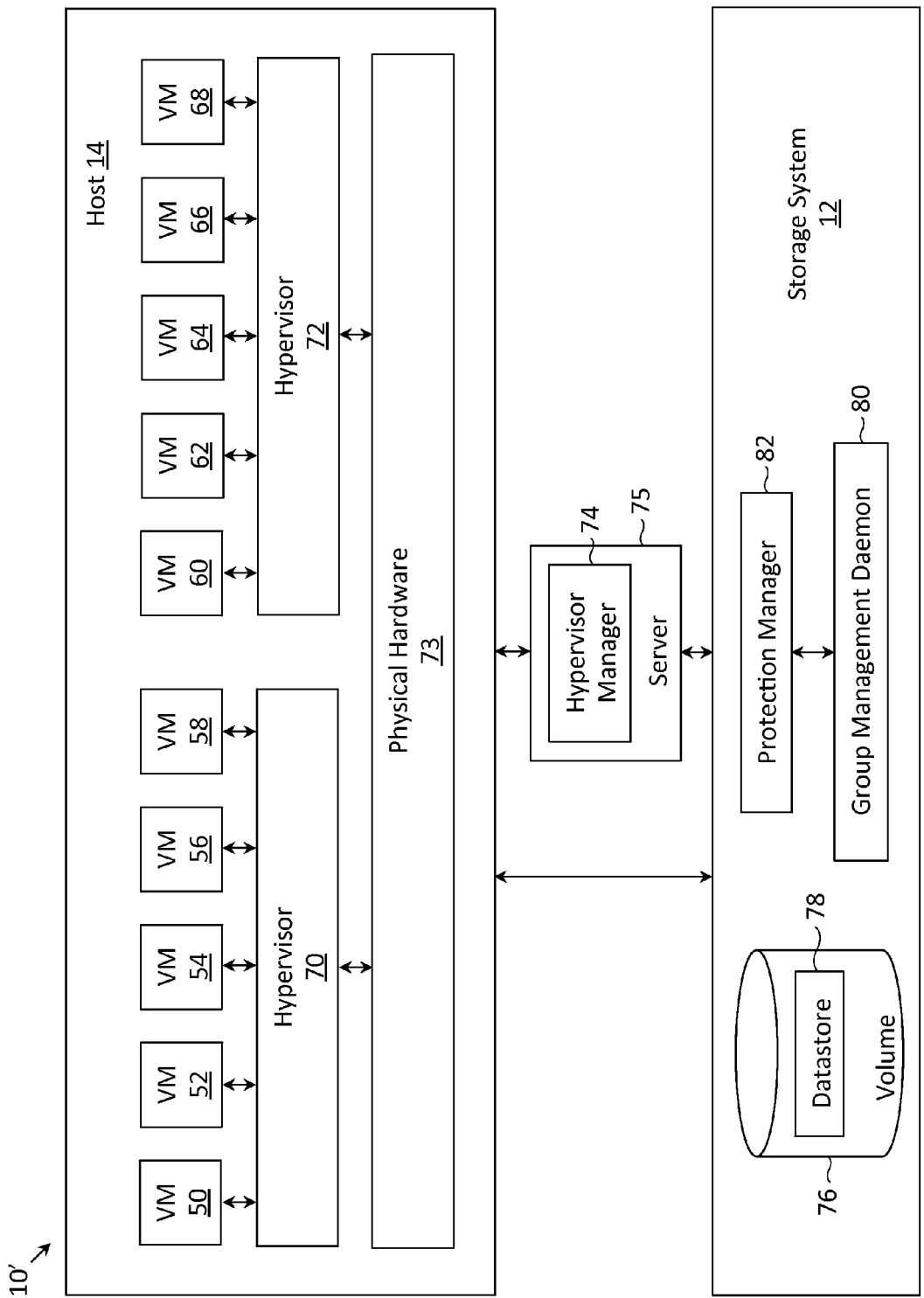
FIGS. 5A-C depict a storage system communicatively coupled to a host and virtual machines instantiated on the host, in accordance with one embodiment.

FIG. 5A depicts system 10' (which is a variant of system 10), within which embodiments of the present invention may be instantiated. In system 10', storage system 12 is communicatively coupled to a specific embodiment of host 14. Instantiated within host 14 are hypervisor 70 and hypervisor 72. Hypervisor 70 may interface virtual machines 50, 52, 54, 56 and 58 with physical hardware 73 of host 14. Likewise, hypervisor 72 may interface virtual machines 60, 62, 64, 66 and 68 with physical hardware 73 of host 14. It is noted that the number of virtual machines per hypervisor (5 in this description) is exemplary and any number of virtual machines per hypervisor may be present in practice. It is also noted that the number of hypervisors communicatively coupled to physical hardware 73 of host 14 (2 in this description) is also exemplary and any number may be present in practice. Examples of hypervisors are ESX™ (or an ESX host) from VMware, Inc.™ of Palo Alto, Calif.; a Xen™ hypervisor from Citrix Systems™ of Fort Lauderdale, Fla.; and a Hyper-V™ from Microsoft Corporation™ of Redmond, Wash.

Figure 3:
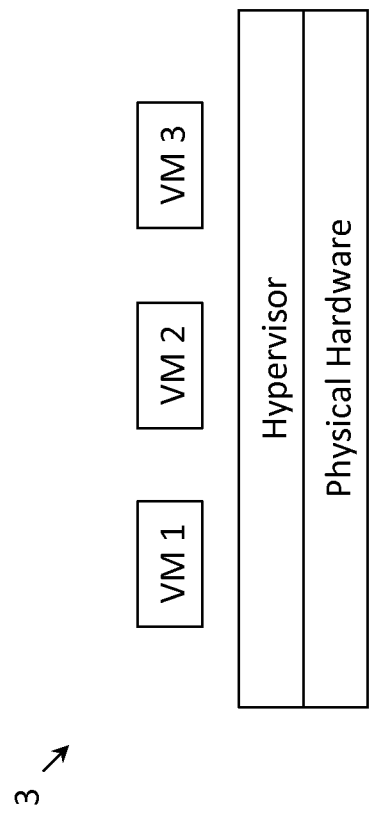
FIG. 3 depicts an abstracted representation of a computing system in which a hypervisor interfaces a plurality of virtual machines with the physical hardware.

It is noted that host 14 may be one embodiment of computer system 3 depicted in FIG. 3. One feature of host 14 not described above in connection with FIG. 3 is that some of the information (e.g., virtual machine data, virtual machine operational state, and virtual machine configuration) associated with each of the virtual machines may not be stored locally on physical hardware 73 of host 14, but rather may be stored remotely in storage system 12 (i.e., remote from the perspective of host 14). With respect to the virtual machine data, the in-memory data of the virtual machine may be stored in the memory of physical hardware 73, while the in-disk data of the virtual machine may be stored in storage system 12.

There may be a variety of reasons for using such remote storage. For example, the storage capacity of storage system 12 may be larger than the storage capacity of host 14, allowing the virtual machines to store a larger amount of data. Another reason may be a snapshot manager that is provided on storage system 12, but not on host 14. Yet another reason may be data integrity. The data on storage system 12 may be stored using data redundancy techniques which allow data to be recovered even if some data bits are corrupted, while data redundancy may not be employed (or may be employed to a lower degree) on host 14.

For ease of explanation, the internal components of storage system 12 have been redrawn in system 10' of FIG. 5A (as compared to its representation in FIG. 4). Depicted within storage system 12 is volume 76, which represents a storage area located on one or more of disk drives (28, 30, 32 and 34). If storage array 26 is implemented with RAID (redundant array of independent disks) techniques, volume 76 may be a logical partition of a RAID group of storage array 26.

Within volume 76 is datastore 78, which represents a portion of volume 76 that is made accessible (via a file system) to hypervisors 70 and 72. Each of the hypervisors in turn makes datastore 78 accessible to its associated virtual machines, and each virtual machine may store its on-disk data on datastore 78. Typically, only one datastore is instantiated on a single volume (as depicted), but it is possible for a datastore to be distributed across multiple volumes (not depicted).

FIG. 5A also depicts protection manager 82 communicatively coupled to group management daemon 80, which may be both instantiated on storage system 12, or more specifically, instantiated on storage controller 16 of storage system 12. Hypervisor manager 74 (which may be instantiated on server 75 separate from both host 14 and storage system 12) may interface protection manager 82 with hypervisors 70 and 72. More specifically, hypervisor manager 74 may keep a record of the virtual machines instantiated on host 14 (as well as other hosts) and a record of where the data of each virtual machine is stored (e.g., a virtual machine to datastore to storage system mapping). An example of a hypervisor manager is a vCenter Server™ from VMware. The operation of protection manager 82, group management daemon 80 and hypervisor manager 74 will be described in more detail below in association with FIGS. 8A-8C.

As a brief overview of the communication between the components of FIG. 5A, when an administrator (not depicted) requests hypervisor manager 74 to activate a particular virtual machine on a particular hypervisor (for purposes of discussion, assume the virtual machine is VM 50 and the hypervisor is hypervisor 70), hypervisor manager 74 may instruct hypervisor 70 to read the on-disk data of virtual machine 50 from datastore 78 of storage system 12 (e.g., information such as the operating system, and other data of the virtual machine). Hypervisor 70 may then read the on-disk data into its local random-access memory (RAM) (i.e., RAM on physical hardware 73) and start executing the virtual machine's operating system. All changes to the virtual machine's on-disk data (as the result of operation of the virtual machine) may be sent to storage system 12 with the assistance of hypervisor 70.

Figure 5B:
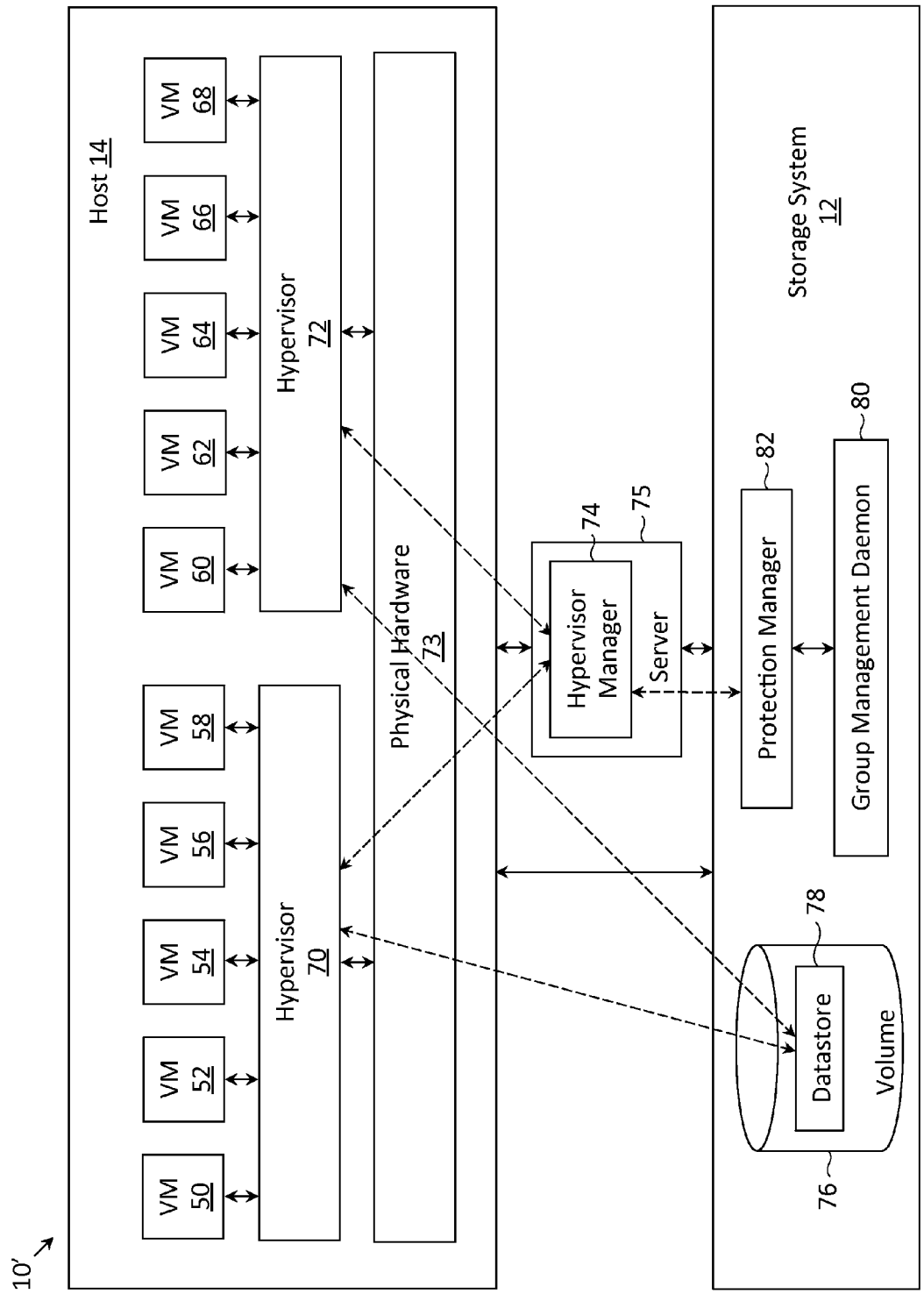

In FIG. 5B, implicit connections (e.g., data flow between two components which may pass through other components) of system 10' are annotated using dotted arrows. An implicit connection exists between hypervisor 70 and datastore 78, as well as between hypervisor 72 and datastore 78. Implicit connections also connect hypervisor manager 74 to each of protection manager 82, hypervisor 70 and hypervisor 72. Such implicit connections were previously described in association with FIG. 5A, and are now annotated in FIG. 5B to make these communication paths more apparent.

Figure 5C:
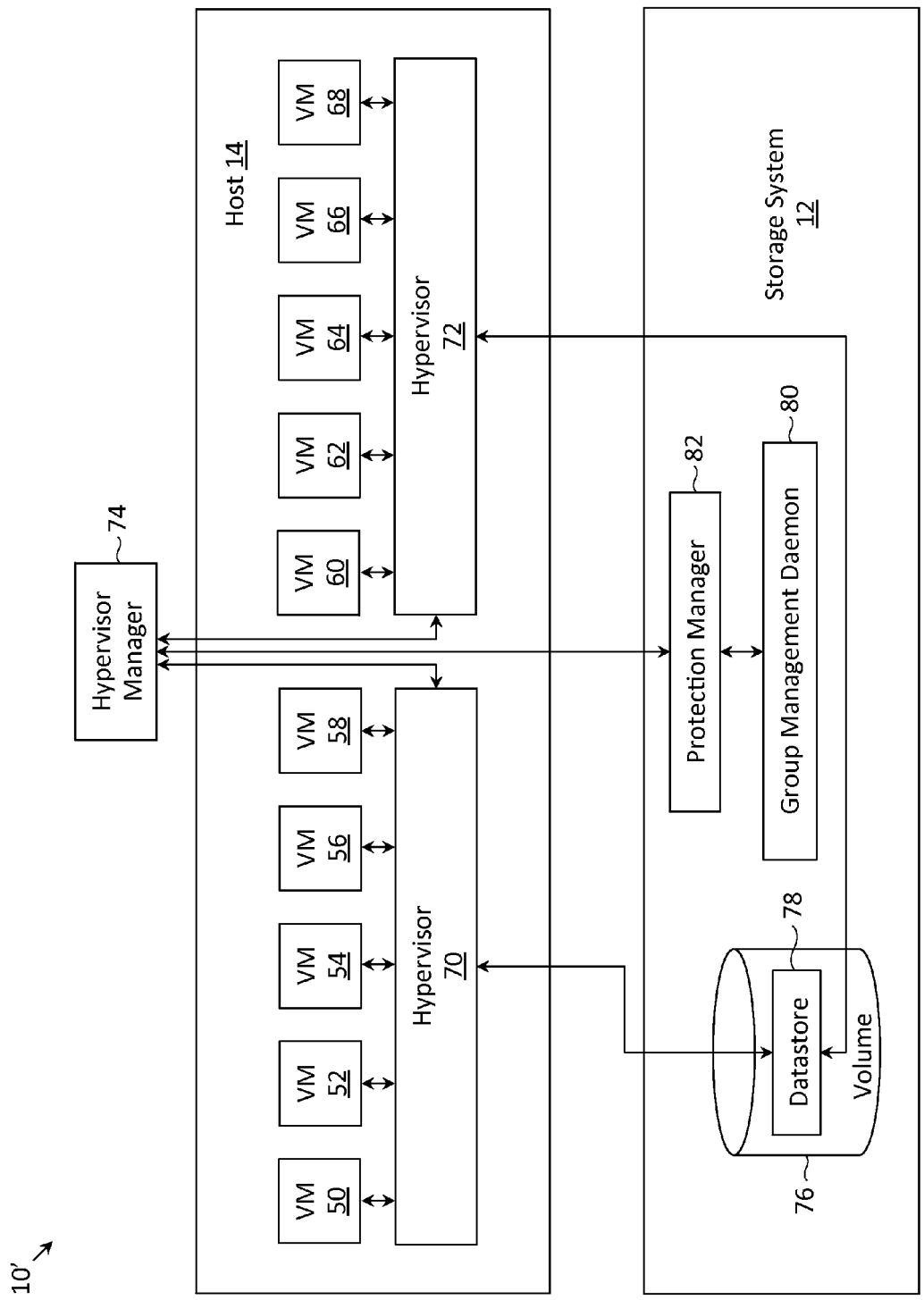

FIG. 5C is an abstracted version of FIG. 5B, depicting those components and communication paths of system 10' that are most relevant to the discussion below. Physical hardware 73 (of host 14) and its communication paths to each of the hypervisors have been omitted, but it should be understood that such omission is only for conciseness of presentation and such component and paths are not actually omitted from host 14. Server 75, on which hypervisor manager 74 is instantiated, is also omitted for conciseness of presentation. Implicit connections drawn using dotted arrows in FIG. 5B have been redrawn using solid arrows in the more abstract representation of FIG. 5C.

Figure 6:
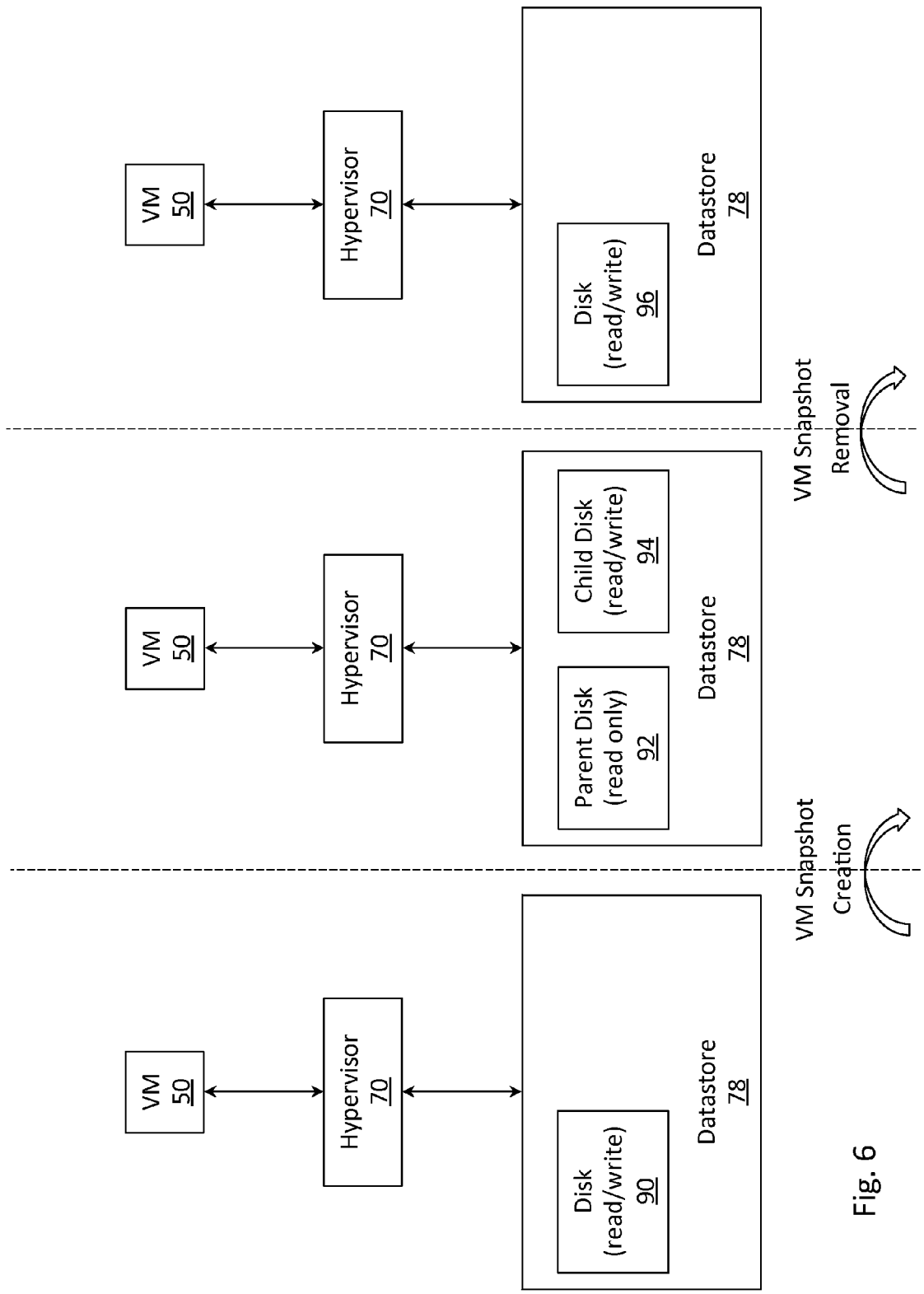
FIG. 6 depicts one or more disks associated with a virtual machine before and after a virtual machine snapshot creation operation, and before and after a virtual machine snapshot removal operation, in accordance with one embodiment.

To facilitate the discussion of virtual machine snapshots, FIG. 6 depicts a portion of the state of virtual machine 50 (i.e., on-disk data of the virtual machine) before and after its snapshot is taken (i.e., before and after a VM snapshot creation operation). Prior to a VM snapshot creation operation, the on-disk data of virtual machine 50 is located on disk 90 (i.e., a file on datastore 78). With the assistance of hypervisor 70, virtual machine 50 may read data from and write data to disk 90. After a virtual machine snapshot, disk 90 is marked as read only and becomes parent disk 92. Further, a child disk 94 (i.e., also a file on datastore 78) is created for storing any new data and modified data of virtual machine 50. Child disk 94 is read/write accessible. Following the virtual machine snapshot, the performance of virtual machine 50 and hypervisor 70 may be degraded during read operations. Instead of simply reading from disk 90 (i.e., which was possible prior to the virtual machine snapshot), hypervisor 70 may need to first read from parent disk 92 and then additionally determine whether any modifications to the data exist on child disk 94. The snapshot, on the other hand, may have little impact on the virtual machine's (and the hypervisor's) performance for write operations, as data may be written to child disk 94 in a similar manner to how it was written to disk 90.

FIG. 6 further depicts the state of virtual machine 50 (more precisely, the on-disk data) after its snapshot is removed (i.e., after a VM snapshot removal operation). The removal operation (i.e., performed by hypervisor 70) causes the data on child disk 94 to be merged onto parent disk 92, and causes the manner in which hypervisor 70 interfaces with datastore 78 to revert back to its original operation (i.e., the operation prior to the VM snapshot creation operation). The resulting disk is depicted as disk 96, which is read/write accessible just like disk 90. Such merging operation may degrade the performance of virtual machine 50 and hypervisor 70, with the degree of the degradation proportional to the size of child disk 94. To elaborate, the more data that is on child disk 94, the more processing that will be involved (and the more time it will take) to transfer data on child disk 94 to parent disk 92.

Another way to understand the performance impact of a virtual machine snapshot on data writes to datastore 78 (while the virtual machine snapshot exists) is to consider that every data write incurs an "extra" data read and write, as compared to a data write prior to a virtual machine snapshot. The extra data read occurs during the snapshot removal operation when data must be read from the child disk, and the extra data write occurs during the snapshot removal operation when data must be written from the child disk to the parent disk.

One way to address the performance impact of a virtual machine snapshot is to remove the snapshot as soon as it is not needed. This will minimize the time the hypervisor is required to read from both the parent and child disks, and will further minimize the time it takes for the hypervisor to remove the virtual machine snapshot (i.e., by minimizing the size of the child disk). While this strategy has merit, it is of no use if the virtual machine snapshot must be maintained for an extended period of time.

One may wonder whether it is possible to achieve the best of both worlds—to both maintain a virtual machine snapshot for an extended period of time and minimize the performance impact of the virtual machine snapshot. The use of a volume snapshot in conjunction with a virtual machine snapshot indeed makes it possible to satisfy both of these objectives. Before detailing how a volume snapshot is employed in conjunction with a virtual machine snapshot, some background information is provided regarding a volume snapshot.

As suggested by its respective names, a volume snapshot preserves the state of a volume (e.g., volume 76), whereas a virtual machine snapshot preserves the state of a virtual machine (e.g., virtual machine 50). If, however, the state of a virtual machine is stored on a volume (e.g., parent and child disk of virtual machine 50 are stored on volume 76) and a snapshot of the volume is taken, whatever information that is stored on volume 76 will be preserved, in turn preserving the state of the virtual machine.

Conceptually, a volume snapshot is similar to a virtual machine snapshot in that they both allow one to revert to the state of a system or device at an earlier point in time. The technical manner in which a volume snapshot is captured, however, is different than the manner in which a virtual machine snapshot is captured. Whereas a virtual machine snapshot involves the creation of a parent and child disk (essentially freezing the state of the virtual machine on the parent disk), a volume snapshot operates on the pointers that organize the data on a volume. A volume snapshot essentially freezes the pointers and is a computationally efficient way to take and maintain a snapshot of a large quantity of data. The specific manner to implement a volume snapshot is known in the art and will not be described further herein.

Lastly, it is noted that a volume snapshot is performed by storage controller 16 and does not require the involvement of any hypervisors. Therefore, while a volume snapshot may have a small impact on the performance of storage system 12 (and the performance of a volume in particular), a volume snapshot does not particularly impact the performance of virtual machines and/or hypervisors. A simplified example may be illustrative here. Suppose that a virtual machine snapshot of virtual machine 50 reduces the performance of virtual machine 50 and hypervisor 70 by 25%. Suppose further that a volume snapshot of volume 76 reduces the performance of volume 76 by 0.1%. As virtual machine 50 and hypervisor 70 interact with volume 76, a volume snapshot will likewise reduce the performance of virtual machine 50 and hypervisor 70 by 0.1%, but this 0.1% will have a much smaller impact than the 25% reduction in performance from a virtual machine snapshot.

How a volume snapshot is used in conjunction with a virtual machine snapshot should now be more apparent. First, a virtual machine snapshot is taken. The virtual machine snapshot is immediately followed by a volume snapshot, which is then immediately followed by the removal of the virtual machine snapshot. This scheme, in fact, is able to achieve the best of both worlds. By removing the virtual machine snapshot (i.e., incorporating the child disk into the parent disk) soon after it is created, the performance impact on the hypervisor and virtual machine is minimized. While the virtual machine snapshot is removed, the state of the virtual machine is still maintained by the volume snapshot.

In light of such benefits, it might seem logical to perform a volume snapshot after every virtual machine snapshot. This approach, however, might not be practical or efficient. Recall, a volume snapshot is a computationally efficient process so it does not degrade the performance of a volume by much. On the other hand, if volume snapshots were performed in a rapid-fire manner, the cumulative effect of the volume snapshots might start to degrade the performance of the volume. Worse yet, a reduction in the volume's performance might degrade the performance of every component and/or process that interfaces with the volume. Accordingly, the performance of all ten virtual machines depicted in FIG. 5A might be degraded if the performance of volume 76 were degraded. In addition, storage systems typically support a limited number of volume snapshots. Performing a volume snapshot after each virtual machine snapshot (and further retaining each volume snapshot after it is created) would cause the storage system to reach the volume snapshot limit very quickly.

Since a volume snapshot preserves the state of all the data on a volume, a compromise is to take snapshots of all virtual machines associated with a volume, then take a volume snapshot (i.e., preserving all the virtual machine snapshots with a single volume snapshot), and then remove all the virtual machine snapshots. Such an approach minimizes the number of volume snapshots (i.e., one volume snapshot for all virtual machine snapshots versus one volume snapshot for each virtual machine snapshot). The tradeoff is that virtual machine snapshots need to be maintained for a longer time. To elaborate, instead of taking a volume snapshot immediately after a single virtual machine snapshot has been created, the volume snapshot will occur only after all virtual machine snapshots have been created, increasing the amount of time that at least some of the virtual machine snapshots need to be maintained.

Figure 7:
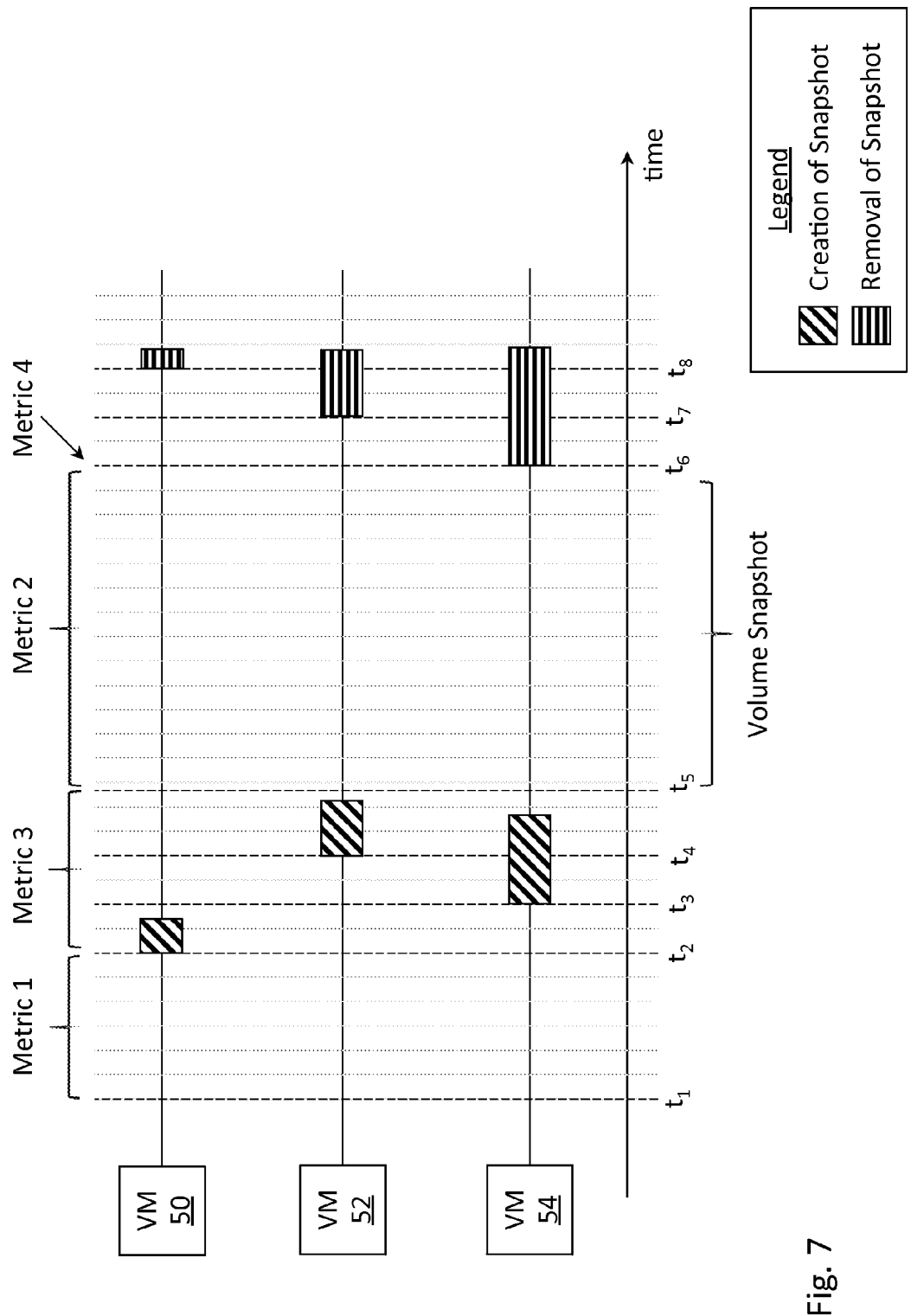
FIG. 7 depicts a sequence diagram of respective snapshot creation and snapshot removal operations for a plurality of virtual machines, in accordance with one embodiment.

Such scenario is explained in more detail in the sequence diagram of FIG. 7. For ease of discussion (and illustration), only three virtual machines (50, 52 and 54) are included in the sequence diagram. The sequence diagram illustrates the virtual machine snapshot of VM 50 being created at time $t_2$, the virtual machine snapshot of VM 54 being created at time $t_3$, and the virtual machine snapshot of VM 52 being created at time $t_4$. Returning to the discussion of the tradeoff, if one were to take volume snapshots after each virtual machine snapshot, one could take a volume snapshot at time $t_3$, immediately after the virtual machine snapshot of VM 50 concludes. Instead, using the approach that takes a volume snapshot only after all virtual machine snapshots have concluded, the volume snapshot is taken at time $t_5$, lengthening the time that at least some of the virtual machine snapshots (e.g., snapshot of VM 50) need to be maintained.

An optimization in the context of FIG. 7 is now described which takes into account the disk write activity of each virtual machine. Virtual machines with a higher disk write activity will be more impacted by virtual machine snapshots, as the size of their respective child disks will grow more rapidly as compared to virtual machines with a lower disk write activity. Accordingly, the snapshots of virtual machine that have the highest disk write activity should be maintained for the shortest amount of time. In other words, those child disks that grow the most rapidly ideally will be given the least time to grow in order to restrict their overall size and reduce the time it takes to remove a virtual machine snapshot. To satisfy such goal, snapshots of "busy" virtual machines (i.e., those with a high disk write activity) could be taken last and removed first. Such approach will be described in detail below.

One initial task is to order the virtual machines by their respective disk write activity. Such ordering may be performed by first monitoring each virtual machine's disk write activity over a period of time (e.g., 15 minutes, 1 hour) prior to the first snapshot operation. As depicted in FIG. 7, the disk write activity associated with each virtual machine could be monitored from time $t_1$ to time $t_2$. A measure of the disk write activity over such a period (prior to the first snapshot operation) will be referred to herein as metric 1. Such disk write activity could be measured in terms of the amount of data written to the virtual machine's disk (i.e., "disk" file), the number of write operations to the disk, or the rate of data writes to the disk (e.g., amount of data written to the disk divided by the length of the monitoring period). In the example of FIG. 7, assume the monitoring indicates that VM 52 has the highest disk write activity, followed by VM 54 and then followed by VM 50. Accordingly, the snapshot of VM 50 would occur first, followed by the snapshot of VM 54, and subsequently followed by the snapshot of VM 52 (as depicted in FIG. 7). It is noted that the time duration of each snapshot creation operation may vary (as depicted in FIG. 7), so to clarify, the order in which snapshots are created refers to the order in which the snapshot creation operations are initiated, and does not necessarily correspond to the order in which the snapshots are completed.

It is noted that for the virtual machine and hypervisor performance, what actually matters is the disk write activity after a virtual machine snapshot (as these writes will cause the size of the child disk to grow). Accordingly, one would ideally order the virtual machines snapshots based on the disk write activity after a virtual machine snapshot. However, measurements after a virtual machine snapshot are certainly not available prior to the snapshot. Consequently, the approach taken is actually an approximation. Disk write activity prior to a virtual machine snapshot (captured in metric 1) is used to estimate the disk write activity after a virtual machine snapshot. Such approximation is accurate in the instances where the disk write activity of a virtual machine remains relatively unchanged after its snapshot.

One might assume that based on metric 1, one would remove the snapshot of VM 52 first, followed by the snapshot of VM 54, followed by the snapshot of VM 50. While such an approach is possible (and indeed could be implemented), it may not be the most optimal approach, as the disk write activity could fluctuate. For example, the disk write activity could change after time $t_2$ and/or the disk write activity during the monitoring period (i.e., between $t_1$ and $t_2$) may not be representative of a virtual machine's typical behavior (e.g., a virtual machine is usually busy, but it just happened that during the monitoring period for metric 1, the virtual machine was idle). To better ascertain each virtual machine's disk write activity, further measurements may be taken.

For instance, the disk write activity between the creation and removal of a virtual machine snapshot may be measured for each virtual machine, such measurement referred to herein as metric 2. In one embodiment, the disk write activity for each virtual machine may be monitored between time $t_5$ (e.g., just after all virtual machine snapshots have been taken) and just prior to time $t_6$ (e.g., just after the completion of the volume snapshot). Such disk write activity could be measured in terms of the amount of data written to the child disk, the number of write operations to the child disk, or the rate of data writes to the child disk (e.g., amount of data written to the child disk divided by the length of the monitoring period). In another embodiment, the time periods monitored for each virtual machine need not be identical across all virtual machines, but for a fair comparison, the disk write activity would be measured in terms of the data rate (rather than the amount of data). For instance, metric 2 for virtual machine 50 could be measured from time $t_3$ to just prior to time $t_6$.

As another example, the time taken to create a virtual machine snapshot may be measured for each virtual machine, such measurement referred to herein as metric 3. Recall, the creation of a virtual machine snapshot involves flushing the in-memory data of the virtual machine (e.g., located in the memory of physical hardware 73) to disk (e.g., datastore 78 of storage system 12) and creating the parent and child disk. For example, such in-memory data may include changes made to data resident on disk that have not yet been saved to disk, or new data stored in the operating system's file system buffer that has not yet been saved to disk. A large portion of the processing during such creation operation is due to the flushing of the in-memory data to disk, so metric 3 may be a good indicator of the amount of the in-memory data. Typically, the amount of in-memory data is correlated with the disk write activity (i.e., the more in-memory data, the higher the disk write activity), so metric 3 can be used to infer the disk write activity at the time of the virtual machine snapshot. Further, assuming that the disk write activity does not fluctuate too much, the time taken to create a virtual machine snapshot can be used to infer the disk write activity after the virtual machine snapshot.

As another example, the size of the child disk just after the conclusion of the volume snapshot could be monitored, such measurement referred to herein as metric 4. Metric 4 is very related to metric 2, as the write activity monitored in metric 2 corresponds exactly to the data that is written to the child disk. It is noted that metric 4 may be directly measured by protection manager 82 (in the instance that the protection manager 82 has access to the child disk), or may need to be measured with the assistance of hypervisor manager 74 (in the instance that protection manager 82 does not have access to the child disk).

Upon measuring metrics 1-4, one or more of the metrics may be used to determine an order for removing the virtual machine snapshots. In a preferred embodiment, a weighted combination of the metrics may be used to determine the order. Example weights and an example approach for forming the weighted combination are described below in association with FIGS. 9A and 9B. In the example of FIG. 7, assume that a weighted combination of the metrics indicates that VM 54 has the highest disk write activity, followed by VM 52 and then followed by VM 50. Accordingly, the snapshot of VM 54 would be removed first, followed by the snapshot of VM 52, and subsequently followed by the snapshot of VM 50 (as depicted in FIG. 7). It is noted that the time duration of each snapshot removal operation may vary (as depicted in FIG. 7), so to clarify, the order in which snapshots are removed refers to the order in which the snapshot removal operations are initiated, and does not necessarily correspond to the order in which the snapshot removals are completed.

It is noted that FIG. 7 is a somewhat simplified illustration of the virtual machine ordering that occurs in practice. In practice, the creation of multiple virtual machine snapshots may be initiated simultaneously and the removal of multiple virtual machine snapshots may be initiated simultaneously. Therefore, the ordering of virtual machines may actually correspond to the ordering of groups of virtual machines. For example, in the instance that the order for the virtual machines is determined as VMs 50, 60, 54, 64, 52 and 62 (ordered from least disk write activity to most disk write activity), the snapshots for VMs 50 and 60 may both be initiated at time $t_2$; the snapshots for VMs 54 and 64 may both be initiated at time $t_3$; and the snapshots of VMs 52 and 62 may both be initiated at time $t_4$.

If the creation (or removal) of multiple virtual machines snapshots may be initiated simultaneously, one might wonder why the ordering of virtual machines even matters, as one could initiate the creation (or removal) of all virtual machines snapshots on a volume at the same time. Such a scheme is, however, not desirable as the creation of all virtual machines snapshots in parallel would likely result in all virtual machine snapshots taking a longer time (relative to the snapshot of a single one of the virtual machines). In practice, there is an upper limit on the number of virtual machine snapshots that can be efficiently created (or removed) in parallel, leading to the snapshots of at least some virtual machines being initiated at a different time than other virtual machines.

Figure 8A:
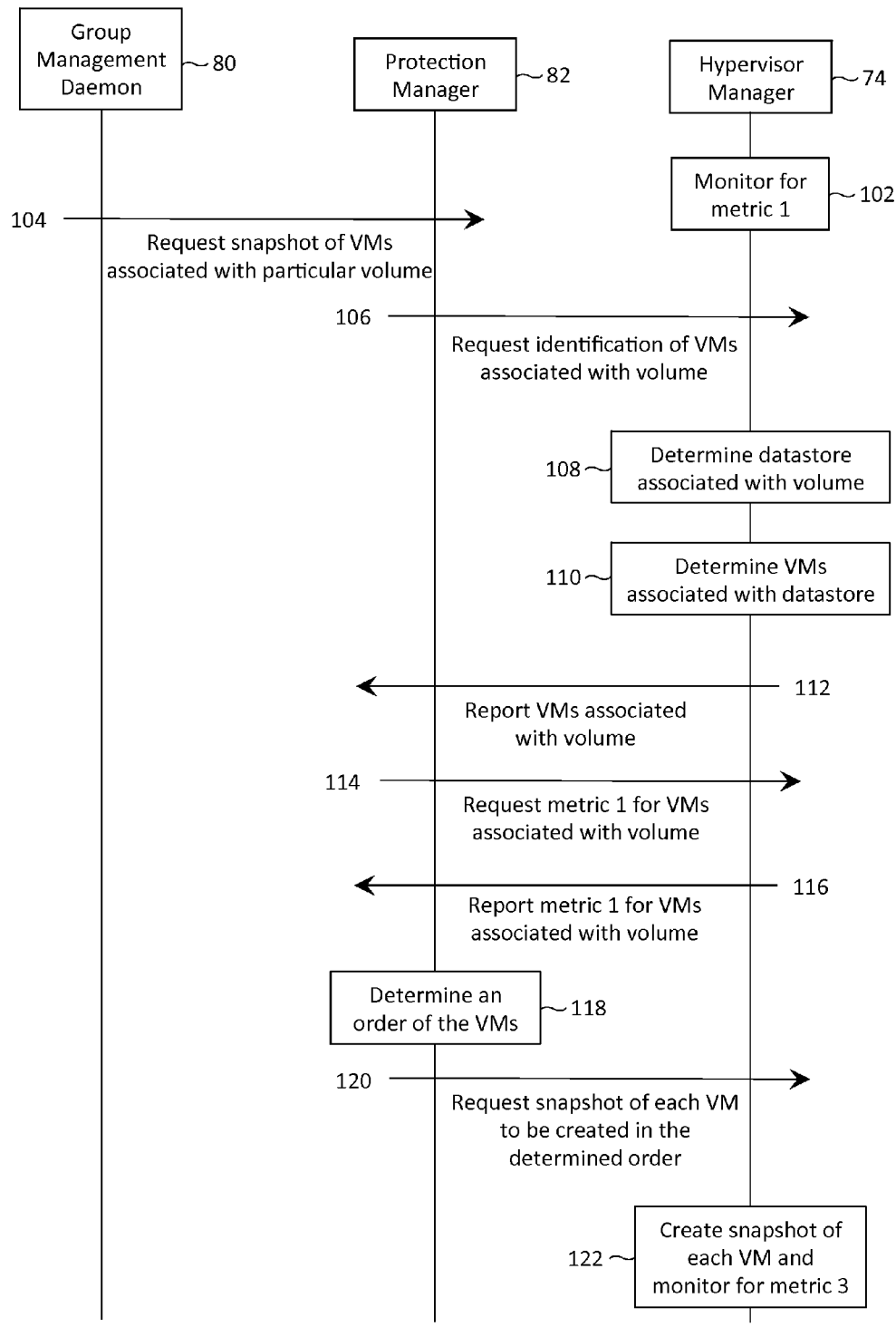
FIGS. 8A-8C depict a sequence diagram of the various interactions between a group management daemon, a protection manager and a hypervisor manager that may occur in the process of taking a volume snapshot, in accordance with one embodiment.
Figure 8B:
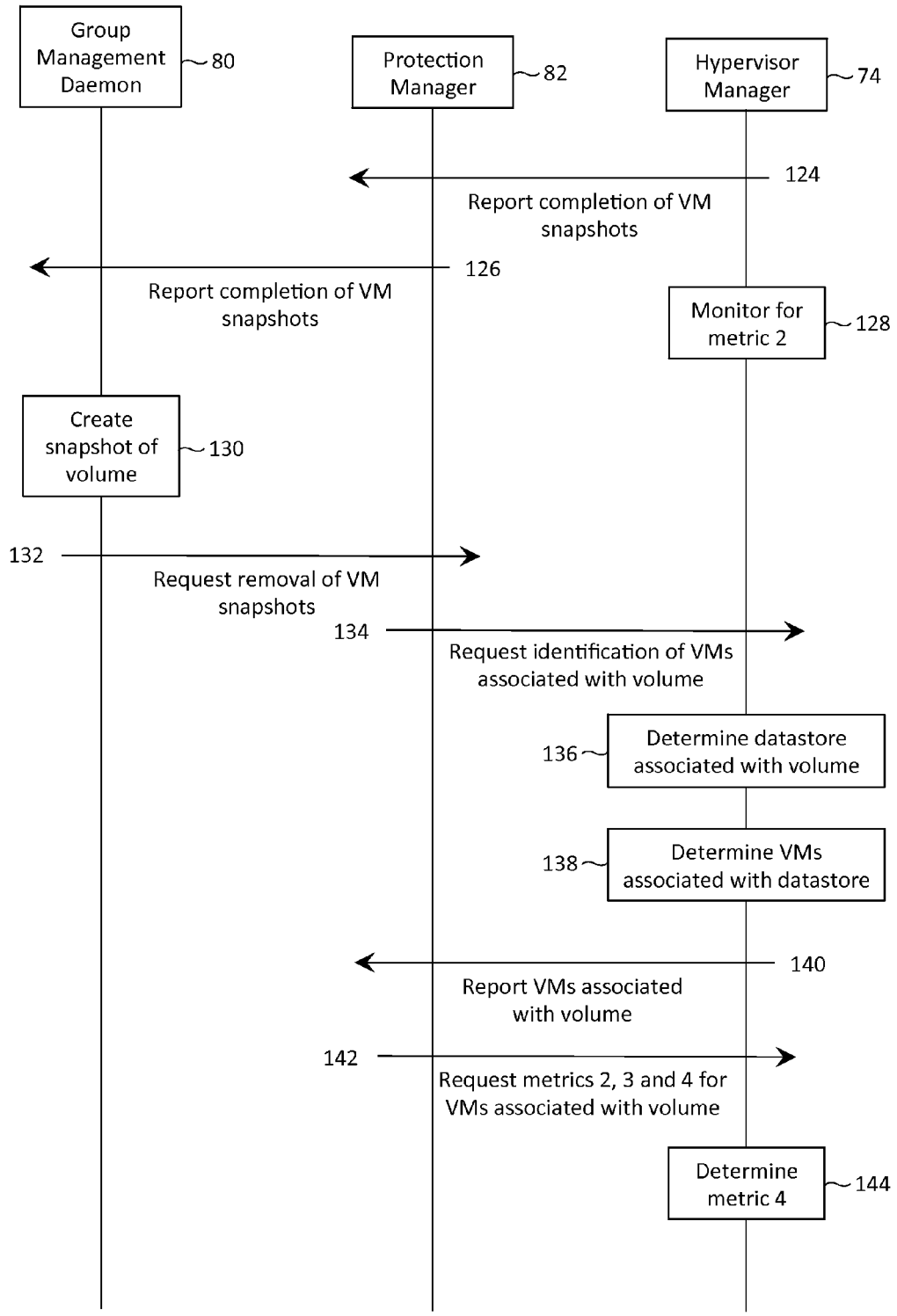
Figure 8C:
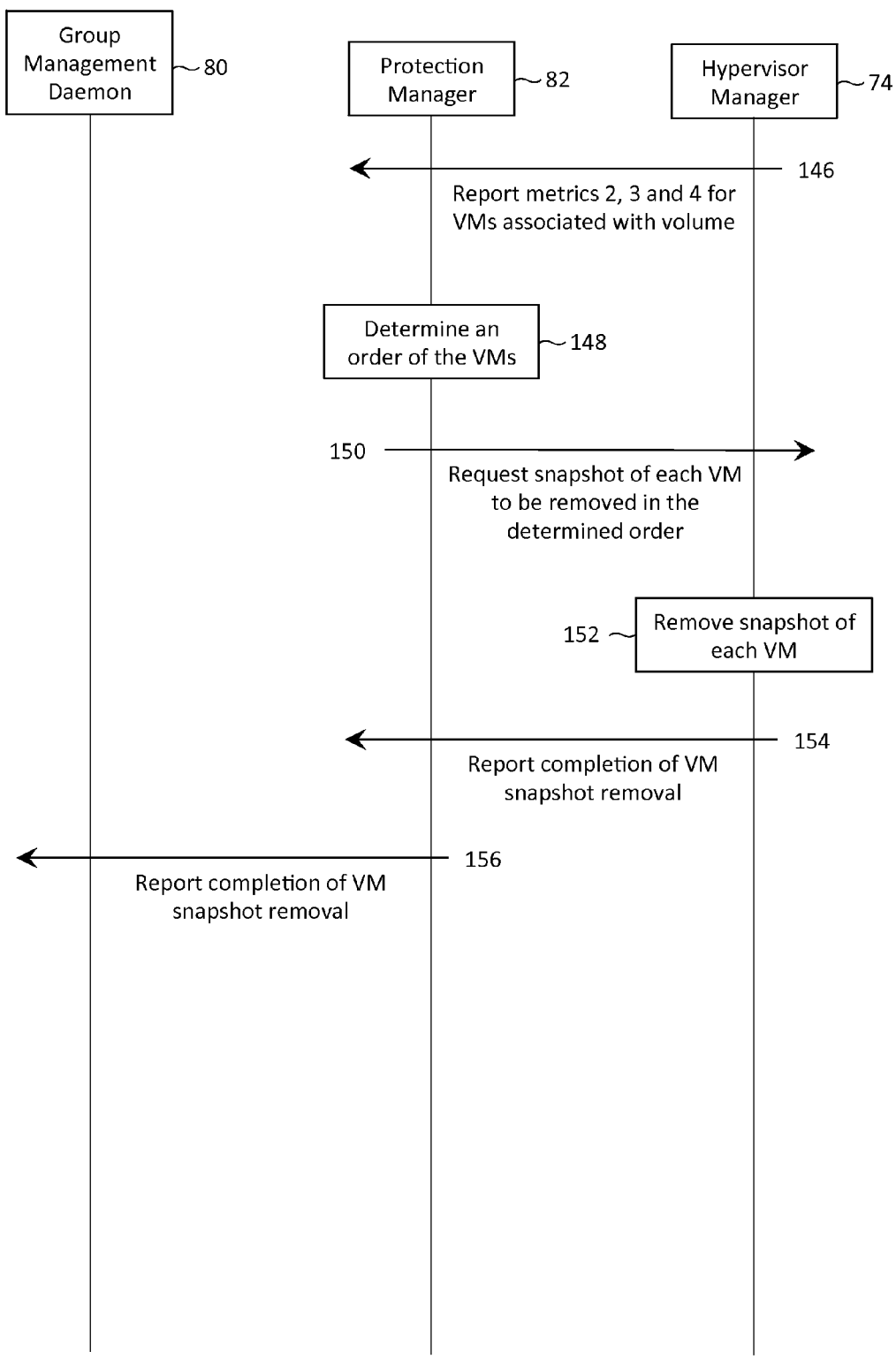

FIGS. 8A-8C depict a sequence diagram of the communication of various commands and data between group management daemon 80, protection manager 82 and hypervisor manager 74 to facilitate the snapshot of a volume and its associated virtual machines. Such sequence diagram is, of course, exemplary in nature and variations to the sequence diagram may be possible. At step 102, hypervisor manager 74 may monitor for metric 1. At step 104, group management daemon 80 may request protection manager 82 to initiate a process to take virtual machine snapshots of one or more virtual machines (or all virtual machines) associated with a particular volume. In the example of FIG. 5C, the volume could be volume 76. The group management daemon's request may be in response to a periodically scheduled snapshot of a volume.

At step 106, protection manager 82 may request hypervisor manager 74 to identify the virtual machines associated with the volume (i.e., the volume specified in step 104). At step 108, hypervisor manager 74 may determine a datastore associated with the volume. In the example of FIG. 5C, hypervisor manager 74 may determine that datastore 78 is associated with volume 76. At step 110, hypervisor manager 74 may determine the virtual machines associated with the datastore. In the example of FIG. 5C, hypervisor manager 74 may determine that virtual machines 50, 52, 54, 56, 58, 60, 62, 64, 66 and 68 are associated with datastore 78. At step 112, hypervisor manager 74 may report the virtual machines associated with the volume to protection manager 82.

At step 114, protection manager 82 may request hypervisor manager 74 to report metric 1 for the virtual machines associated with the volume. At step 116, hypervisor manager 74 may report metric 1 for the virtual machines associated with the volume. At step 118, protection manager 82 may determine an order for the virtual machines based on metric 1, for example, ordering the virtual machines that are less "busy" (i.e., those with a lower disk write activity) before those that are more "busy" (i.e., those with a higher disk write activity). At step 120, protection manager may request hypervisor manager 74 to take a snapshot of each of the virtual machines in accordance with the determined order. At step 122, hypervisor manager 74 may create a snapshot of each of the virtual machines in the requested order, and at the same time, monitor for metric 3. In creating the snapshots, hypervisor manager 74 may actually instruct each of hypervisors 70 and 72 to create the snapshots. In the context of FIG. 5C, suppose the virtual machines were ordered as follows: VM 54, VM 60, VM 58, VM 56, VM 68, VM 66, VM 64, VM 62, VM 50, VM 52. Hypervisor manager 74 may instruct hypervisor 70 to take a snapshot of VM 54; then, hypervisor manager 74 may instruct hypervisor 72 to take a snapshot of VM 60; then, hypervisor manager 74 may instruct hypervisor 70 to take a snapshot of VM 58; and so on. At step 124, hypervisor manager 74 may report the completion of all the virtual machine snapshots to protection manager 82. At step 126, protection manager 82 may report the completion of the virtual machine snapshots to group management daemon 80. Subsequent to step 124, hypervisor manager 74 may also monitor for metric 2 (step 128).

At step 130, group management daemon 80 may create a snapshot of the volume. In the example of FIG. 5C, group management daemon 80 may create a snapshot of volume 76. At step 132, group management daemon 80 may transmit a request to protection manager 82 to remove all the virtual machine snapshots associated with the volume (i.e., the volume for which the volume snapshot just completed). At step 134, protection manager 82 may request hypervisor manager 74 to identify all the virtual machines that are associated with the volume. At step 136, hypervisor manager 74 may determine a datastore associated with the volume. In the example of FIG. 5C, hypervisor manager 74 may determine that datastore 78 is associated with volume 76. At step 138, hypervisor manager 74 may determine the virtual machines associated with the datastore. In the example of FIG. 5C, hypervisor manager 74 may determine that virtual machines 50, 52, 54, 56, 58, 60, 62, 64, 66 and 68 are associated with datastore 78. At step 140, hypervisor manager 74 may report the virtual machines associated with the volume to protection manager 82. It is noted that steps 134, 136, 138 and 140 need not be performed if protection manager 82 maintains a record of the virtual machines associated with each volume (e.g., such record recording the information previously received during step 112).

At step 142, protection manager 82 may request metrics 2, 3 and 4 for the virtual machines associated with the volume. Upon receiving the request for metrics 2, 3 and 4, hypervisor manager 74 should already have the data for metrics 2 and 3 available, as it was already monitoring for these metrics in steps 122 and 128. If hypervisor manager 74 does not have the data for metric 4 available, it may determine same at step 144. At step 146, hypervisor manager 74 may report metrics 2, 3 and 4 to protection manager 82. Based on one or more of metrics 1-4, protection manager 82 may determine an order of the virtual machines (step 148), for example, ordering the virtual machines that are more "busy" before those that are less "busy". At step 150, protection manager 82 may request hypervisor manager 74 to remove the snapshot of each virtual machine in accordance with the determined order. At step 152, hypervisor manager 74 may remove the snapshot of each of the virtual machines in the requested order. In removing the snapshots, hypervisor manager 74 may actually instruct each of hypervisors 70 and 72 to remove the snapshots. In the context of FIG. 5C, suppose the virtual machines were ordered as follows: VM 50, VM 62, VM 52, VM 56, VM 66, VM 68, VM 64, VM 60, VM 58, VM 54. Hypervisor manager 74 may instruct hypervisor 70 to remove the snapshot of VM 50; then, hypervisor manager 74 may instruct hypervisor 72 to remove the snapshot of VM 62; then, hypervisor manager 74 may instruct hypervisor 70 to remove the snapshot of VM 52; and so on. At step 154, hypervisor manager 74 may report the completion of the virtual machine snapshot removal to protection manager 82. At step 156, protection manager 82 may report the completion of the virtual machine snapshot removal to group management daemon 80.

FIGS. 9A and 9B provide further details on the relative weighting of the metrics and how to combine the metrics to arrive upon an order to remove the virtual machines. For ease of discussion, FIG. 9A only analyzes five out of the ten virtual machines of FIG. 5C (i.e., VM 50, VM 52, VM 54, VM 56 and VM 58), while all of the virtual machines of FIG. 5C could be analyzed in practice. As depicted in FIG. 9A, the five virtual machines may be ranked in accordance with each of the metrics (see rankings from 1 to 5 in the columns under the headings VM 50, VM 52, VM 54, VM 56 and VM 58). For instance, with respect to the first metric of disk writes before snapshot creation (e.g., the number of disk writes before virtual machine snapshot creation), the virtual machine with the greatest disk writes is given a ranking of 5 (i.e., VM 50) and the virtual machine with the lowest disk writes is given a ranking of 1 (i.e., VM 58). In FIG. 9A, higher rankings are used to indicate busier virtual machines, but this is just one possibility. In other embodiments, lower rankings could instead be used to indicate busier virtual machines.

In the column with heading "Weight of Metric", weights are assigned to each of the metrics. Metric 1 (i.e., disk writes before snapshot creation) is assigned a weight of 3, metric 2 (i.e., disk writes between snapshot creation and snapshot removal) is assigned a weight of 2, metric 3 (i.e., time taken to create snapshot) is assigned a weight of 1, and metric 4 (i.e., size of child disk) is assigned a weight of 4. Higher weights may be assigned to metrics that are determined to be more reliable indicators of disk write activity (and/or are more correlated with the performance of virtual machines and hypervisors). Such weights are exemplary and other weights may be assigned in practice. It is possible that two metrics may be assigned equal weights, and if there is no information indicating which metrics are more reliable relative to other metrics, all metrics may be assigned equal weights.

For each virtual machine, a consolidated rating may be computed as a linear combination of the ranks weighted by the metric weights. For example, for virtual machine 50, the consolidated rating may be computed as 3*5+2*4+1*3+4*4=42. A higher consolidated rating may indicate a busier virtual machine (i.e., a virtual machine with more disk write activity). Therefore, among VMs 50, 52, 54, 56 and 58, VM 50 was determined as the busiest virtual machine, followed by VM 52 as the second most busy virtual machine, VM 54 as the third most busy virtual machine, VM 56 as the fourth most busy virtual machine, and VM 58 as the least busy virtual machine. Accordingly, the virtual machine snapshot associated with VM 50 could be removed first, followed by the virtual machine snapshot associated with VM 52, and so on.

FIG. 9A provides an example with one group of virtual machines (e.g., VMs 50, 52 and 54) being busier than another group of virtual machines (e.g., VMs 56 and 58). In contrast, FIG. 9B provides an example with one virtual machine (i.e., VM 50) being busier than all the other virtual machines (e.g., VMs 52, 54, 56 and 58). The order for removing the virtual machines in the example of FIG. 9B could be VM 50, followed by VM 56, followed by VM 54, followed by VM 52 and finally VM 58.

In another embodiment, the virtual machines need not be ranked with respect to one another (for each of the metrics). Rather, the measurements for each metric can be viewed as a vector, and a unit vector can be computed for each of the vectors. For example, the following vectors may be formed for metric 4:

$$\text{Vector } v = \begin{bmatrix} \text{size of child disk of } VM\ 50 \\ \text{size of child disk of } VM\ 52 \\ \text{size of child disk of } VM\ 54 \\ \text{size of child disk of } VM\ 56 \\ \text{size of child disk of } VM\ 58 \end{bmatrix}$$

$$\text{Unit vector } u = \frac{v}{\|v\|}$$

A linear combination may be formed from each component of the unit vectors to arrive at consolidated ratings (i.e., consolidated rating for VM 50 could be the linear combination of the first components of all of the unit vectors; consolidated rating for VM 52 could be the linear combination of the second components of all of the unit vectors; and so on). This approach preserves the relative magnitude of the measurements for each metrics, as compared to the approach with rankings, which loses the relative magnitudes. Other approaches to compute consolidated ratings are possible and the two above-described approaches are merely two examples.

It is further noted that, in the embodiments described above, the order for initiating the creation of the virtual machine snapshots was only based on metric 1. In other embodiments, the order for initiating the creation of the virtual machine snapshots may be based on one or more metrics. For example, in addition to measuring the disk write activity during a period of time prior to the snapshot of the virtual machines, the disk read activity could also be measured, and such measurements could be used in conjunction with measurements of the disk write activity to order the creation of the virtual machine snapshots.

At this point, it may be illustrative to provide a numerical comparison of the disk input/output (I/O) with and without the above-described virtual machine ordering techniques. Suppose there are ten virtual machines associated with a volume, just as in the example of FIG. 5A. Further suppose that one of the virtual machines is busy and writes data at the rate of 1 megabyte (MB) per second, while the other nine virtual machines are relatively idle. In the worse case scenario (without the above-described virtual machine ordering techniques), the busy virtual machine's snapshot is created first and removed last. Further suppose that the time duration between the creation and removal operations is 5 minutes. In this case, the virtual machine snapshot removal process would cause an additional disk I/O of 300 MB reads and 300 MB writes (i.e., reads and writes that would not have occurred but for the virtual machine snapshot, 300 MB calculated as 1 MB/second times 300 seconds). In contrast, using the above-described virtual machine ordering techniques, if the busy virtual machine's snapshot is created last and deleted first and the time between these two operations is 10 seconds, there is only an additional disk I/O of 10 MB reads and 10 MB writes (10 MB calculated as 1 MB/second times 10 seconds). The above-described virtual machine ordering technique would result in a reduction of approximately 97% of the read and write I/O (97% calculated as 290/300).

While the discussion so far has been directed at ranking virtual machines in accordance with their respective disk write (and/or read) activity so as to determine an order in which to create and remove snapshots of the virtual machines, virtual machine rankings could be applied in other contexts. For instance, virtual machine rankings could be applied to better distribute virtual machines to hypervisors and/or make recommendations on how to better distribute virtual machines to hypervisors. Upon ranking the virtual machines of a volume, one might determine that the top five virtual machines (i.e., the five virtual machines with the highest disk write activity) are all associated with the same hypervisor. In response to such determination, the top five virtual machines could be distributed among all the hypervisors (e.g., in the instance where there are five hypervisors associated with the volume, each hypervisor could be paired with one of the five busy virtual machines).

As another application, virtual machine rankings (e.g., ranked in an order of importance rather than disk write activity) could be applied to better distribute virtual machines to datastores and/or make recommendations on how to better distribute virtual machines to datastores. In the scenario that a volume snapshot exceeds a desired time limit, important virtual machines could be moved from datastores with a low quality of service (i.e., datastores that experience a high latency for requests) to datastores with a higher quality of service (i.e., datastores that experience a low latency for requests). For instance, a virtual machine hosting an important application (therefore making it an important virtual machine), such as a mail server, could be adversely impacted if a virtual machine snapshot is retained for a few minutes in every hour. This can happen when an hourly snapshot of the important virtual machine is required for business continuance. By moving the important virtual machine to a different datastore with a higher quality of service (or by moving less important virtual machine(s) out of the same datastore as the important virtual machine), the quality of service of the datastore servicing the important virtual machine can be increased. "Important applications" could be those applications that are user-facing and/or time sensitive, such as a mail server, web server, etc.

As another application of virtual machine rankings, snapshots could be taken more often for busy virtual machines, and less often for idle virtual machines.

Figure 10:
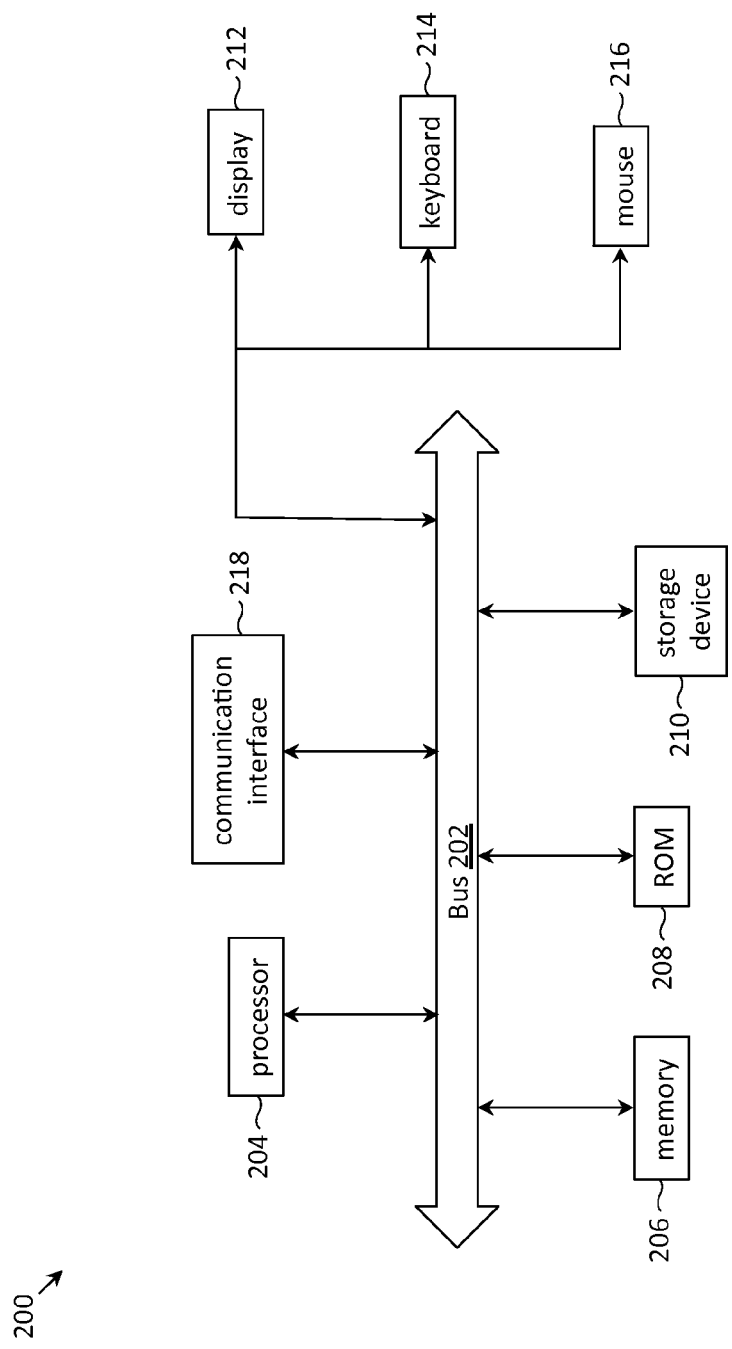
FIG. 10 depicts components of a computer system in which computer readable instructions instantiating the methods of the present invention may be stored and executed.

As is apparent from the foregoing discussion, aspects of the present invention involve the use of various computer systems and computer readable storage media having computer-readable instructions stored thereon. FIG. 10 provides an example of a system 200 that is representative of any of the computing systems discussed herein. Further, computer system 200 may be representative of one or more of hypervisor manager 74, group management daemon 80 and protection manager 82, and may be representative of one or more components that perform the processes depicted in FIGS. 8A-8C. Note, not all of the various computer systems have all of the features of system 200. For example, certain ones of the computer systems discussed above may not include a display inasmuch as the display function may be provided by a client computer communicatively coupled to the computer system or a display function may be unnecessary. Such details are not critical to the present invention.

System 200 includes a bus 202 or other communication mechanism for communicating information, and a processor 204 coupled with the bus 202 for processing information. Computer system 200 also includes a main memory 206, such as a random access memory (RAM) or other dynamic storage device, coupled to the bus 202 for storing information and instructions to be executed by processor 204. Main memory 206 also may be used for storing temporary variables or other intermediate information during execution of instructions to be executed by processor 204. Computer system 200 further includes a read only memory (ROM) 208 or other static storage device coupled to the bus 202 for storing static information and instructions for the processor 204. A storage device 210, which may be one or more of a floppy disk, a flexible disk, a hard disk, flash memory-based storage medium, magnetic tape or other magnetic storage medium, a compact disk (CD)-ROM, a digital versatile disk (DVD)-ROM, or other optical storage medium, or any other storage medium from which processor 204 can read, is provided and coupled to the bus 202 for storing information and instructions (e.g., operating systems, applications programs and the like).

Computer system 200 may be coupled via the bus 202 to a display 212, such as a flat panel display, for displaying information to a computer user. An input device 214, such as a keyboard including alphanumeric and other keys, may be coupled to the bus 202 for communicating information and command selections to the processor 204. Another type of user input device is cursor control device 216, such as a mouse, a trackball, or cursor direction keys for communicating direction information and command selections to processor 204 and for controlling cursor movement on the display 212. Other user interface devices, such as microphones, speakers, etc. are not shown in detail but may be involved with the receipt of user input and/or presentation of output.

The processes referred to herein may be implemented by processor 204 executing appropriate sequences of computer-readable instructions contained in main memory 206. Such instructions may be read into main memory 206 from another computer-readable medium, such as storage device 210, and execution of the sequences of instructions contained in the main memory 206 causes the processor 204 to perform the associated actions. In alternative embodiments, hard-wired circuitry or firmware-controlled processing units (e.g., field programmable gate arrays) may be used in place of or in combination with processor 204 and its associated computer software instructions to implement the invention. The computer-readable instructions may be rendered in any computer language including, without limitation, C#, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ and the like. In general, all of the aforementioned terms are meant to encompass any series of logical steps performed in a sequence to accomplish a given purpose, which is the hallmark of any computer-executable application. Unless specifically stated otherwise, it should be appreciated that throughout the description of the present invention, use of terms such as "processing", "computing", "calculating", "determining", "displaying", "receiving", "transmitting" or the like, refer to the action and processes of an appropriately programmed computer system, such as computer system 200 or similar electronic computing device, that manipulates and transforms data represented as physical (electronic) quantities within its registers and memories into other data similarly represented as physical quantities within its memories or registers or other such information storage, transmission or display devices.

Computer system 200 also includes a communication interface 218 coupled to the bus 202. Communication interface 218 may provide a two-way data communication channel with a computer network, which provides connectivity to and among the various computer systems discussed above. For example, communication interface 218 may be a local area network (LAN) card to provide a data communication connection to a compatible LAN, which itself is communicatively coupled to the Internet through one or more Internet service provider networks. The precise details of such communication paths are not critical to the present invention. What is important is that computer system 200 can send and receive messages and data through the communication interface 218 and in that way communicate with hosts accessible via the Internet.

Thus, methods and systems for managing virtual machine snapshots have been described. It is to be understood that the above-description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A method for creating and removing snapshots of a plurality of virtual machines instantiated on a host, all of the virtual machines storing data on a volume of a storage system communicatively coupled to the host, the method comprising:
   receiving by a hypervisor manager a first request to create snapshots of all of the virtual machines associated with the volume so as to maintain a state of each of the virtual machines, wherein the first request includes a first order of the virtual machines, and the first order is based on a first group of one or more metrics associated with the virtual machines;
   instructing by the hypervisor manager one or more hypervisors instantiated on the host to create, via a plurality of snapshot creation operations, the snapshots of all of the virtual machines associated with the volume, wherein the virtual machine snapshot creation operations are initiated in the first order;
   subsequent to the storage system taking a snapshot of the volume, receiving by the hypervisor manager a second request to remove the snapshots of all of the virtual machines associated with the volume, wherein the second request includes a second order of the virtual machines, the second order is based on a second group of one or more metrics associated with the virtual machines, and at least one metric from the second group does not belong to the first group, wherein the at least one metric from the second group that does not belong to the first group comprises, for each of the virtual machines, a disk write activity of the virtual machine during the snapshot of the volume; and
   instructing by the hypervisor manager one or more of the hypervisors to remove, via a plurality of snapshot removal operations, the snapshots of all of the virtual machines associated with the volume, wherein the virtual machine snapshot removal operations are initiated in the second order, and wherein the removal of all the virtual machine snapshots associated with the volume occurs without removal of the volume snapshot.

2. The method of claim 1, wherein the first group of metrics include, for each of the virtual machines, a disk write activity of the virtual machine prior to the creation of the snapshot of the virtual machine.

3. The method of claim 1, wherein the second group of metrics include, for each of the virtual machines, one or more of a disk write activity of the virtual machine prior to the creation of the snapshot of the virtual machine, a disk write activity of the virtual machine after the creation of the virtual machine snapshot and before the removal of the virtual machine snapshot, a time taken to create the virtual machine snapshot, and a size of a child disk associated with the virtual machine.

4. The method of claim 3, wherein the at least one metric from the second group that does not belong to the first group further comprises the time taken to create the virtual machine snapshot.

5. The method of claim 3, wherein the at least one metric from the second group that does not belong to the first group further comprises the size of the child disk associated with the virtual machine.

6. The method of claim 1, wherein the first and second requests are received from the storage system.

7. A server for creating and removing snapshots of a plurality of virtual machines instantiated on a host, all of the virtual machines storing data on a volume of a storage system communicatively coupled to the host, the server comprising:
   a main memory;
   a processor communicatively coupled to the main memory; and
   software instructions on the main memory that, when executed by the processor, cause the processor to:
      receive a first request to create snapshots of all of the virtual machines associated with the volume so as to maintain a state of each of the virtual machines, wherein the first request includes a first order of the virtual machines, and the first order is based on a first group of one or more metrics associated with the virtual machines;
      instruct one or more hypervisors instantiated on the host to create, via a plurality of snapshot creation operations, the snapshots of all of the virtual machines associated with the volume, wherein the virtual machine snapshot creation operations are initiated in the first order;
      subsequent to the storage system taking a snapshot of the volume, receive a second request to remove the snapshots of all of the virtual machines associated with the volume, wherein the second request includes a second order of the virtual machines, the second order is based on a second group of one or more metrics associated with the virtual machines, and at least one metric from the second group does not belong to the first group, wherein the at least one metric from the second group that does not belong to the first group comprises, for each of the virtual machines, a disk write activity of the virtual machine during the snapshot of the volume; and
      instruct one or more of the hypervisors to remove, via a plurality of snapshot removal operations, the snapshots of all of the virtual machines associated with the volume, wherein the virtual machine snapshot removal operations are initiated in the second order, and wherein the removal of all the virtual machine snapshots associated with the volume occurs without removal of the volume snapshot.

8. The server of claim 7, wherein the first group of metrics include, for each of the virtual machines, a disk write activity of the virtual machine prior to the creation of the snapshot of the virtual machine.

9. The server of claim 7, wherein the second group of metrics include, for each of the virtual machines, one or more of a disk write activity of the virtual machine prior to the creation of the snapshot of the virtual machine, a disk write activity of the virtual machine after the creation of the virtual machine snapshot and before the removal of the virtual machine snapshot, a time taken to create the virtual machine snapshot, and a size of a child disk associated with the virtual machine.

10. The server of claim 9, wherein the at least one metric from the second group that does not belong to the first group further comprises the time taken to create the virtual machine snapshot.

11. The server of claim 9, wherein the at least one metric from the second group that does not belong to the first group further comprises the size of the child disk associated with the virtual machine.

12. The server of claim 7, wherein the first and second requests are received from a storage system on which data of the virtual machines is stored.

13. A non-transitory machine-readable storage medium for creating and removing snapshots of a plurality of virtual machines instantiated on a host, all of the virtual machines storing data on a volume of a storage system communicatively coupled to the host, the non-transitory machine-readable storage medium comprising software instructions that, when executed by a processor of a server, cause the server to:
receive a first request to create snapshots of the virtual machines associated with the volume so as to maintain a state of each of the virtual machines, wherein the first request includes a first order of the virtual machines, and the first order is based on a first group of one or more metrics associated with the virtual machines;
instruct one or more hypervisors instantiated on the host to create, via a plurality of snapshot creation operations, the snapshots of all of the virtual machines associated with the volume, wherein the virtual machine snapshot creation operations are initiated in the first order;

subsequent to the storage system taking a snapshot of the volume, receive a second request to remove the snapshots of all of the virtual machines associated with the volume, wherein the second request includes a second order of the virtual machines, the second order is based on a second group of one or more metrics associated with the virtual machines, and at least one metric from the second group does not belong to the first group, wherein the at least one metric from the second group that does not belong to the first group comprises, for each of the virtual machines, a disk write activity of the virtual machine during the snapshot of the volume; and
instruct one or more of the hypervisors to remove, via a plurality of snapshot removal operations, the snapshots of all of the virtual machines associated with the volume, wherein the virtual machine snapshot removal operations are initiated in the second order, and wherein the removal of all the virtual machine snapshots associated with the volume occurs without removal of the volume snapshot.

14. The non-transitory machine-readable storage medium of claim 13, wherein the first group of metrics include, for each of the virtual machines, a disk write activity of the virtual machine prior to the creation of the snapshot of the virtual machine.

15. The non-transitory machine-readable storage medium of claim 13, wherein the second group of metrics include, for each of the virtual machines, one or more of a disk write activity of the virtual machine prior to the creation of the snapshot of the virtual machine, a disk write activity of the virtual machine after the creation of the virtual machine snapshot and before the removal of the virtual machine snapshot, a time taken to create the virtual machine snapshot, and a size of a child disk associated with the virtual machine.

16. The non-transitory machine-readable storage medium of claim 15, wherein the at least one metric from the second group that does not belong to the first group further comprises the time taken to create the virtual machine snapshot.

17. The non-transitory machine-readable storage medium of claim 15, wherein the at least one metric from the second group that does not belong to the first group further comprises the size of the child disk associated with the virtual machine.

* * * * *